US008457956B2

(12) United States Patent
Truman et al.

(10) Patent No.: US 8,457,956 B2
(45) Date of Patent: Jun. 4, 2013

(54) RECONSTRUCTING AN AUDIO SIGNAL BY SPECTRAL COMPONENT REGENERATION AND NOISE BLENDING

(75) Inventors: Michael Mead Truman, Missouri City, TX (US); Mark Stuart Vinton, San Francisco, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 13/601,182

(22) Filed: Aug. 31, 2012

(65) Prior Publication Data

US 2012/0328121 A1 Dec. 27, 2012

Related U.S. Application Data

(63) Continuation of application No. 13/357,545, filed on Jan. 24, 2012, now Pat. No. 8,285,543, which is a continuation of application No. 12/391,936, filed on Feb. 24, 2009, now Pat. No. 8,126,709, which is a continuation of application No. 10/113,858, filed on Mar. 28, 2002, now abandoned.

(51) Int. Cl.

| | |
|---|---|
| ***G06F 15/00*** | (2006.01) |
| ***G10L 11/00*** | (2006.01) |
| ***G10L 19/00*** | (2006.01) |
| ***G10L 21/00*** | (2006.01) |
| ***G10L 19/14*** | (2006.01) |
| ***G10L 21/02*** | (2006.01) |

(52) U.S. Cl.

USPC ........ 704/228; 704/200; 704/200.1; 704/201; 704/205; 704/226

(58) Field of Classification Search

USPC ............... 704/200, 200.1, 201, 205, 226, 228

See application file for complete search history.

(56) References Cited

U.S. PATENT DOCUMENTS 3,684,838 A 8/1972 Kahn (Continued)

FOREIGN PATENT DOCUMENTS

| | | |
|---|---|---|
| DE | 19509149 | 9/1996 |
| EP | 0746116 | 12/1996 |

(Continued)

OTHER PUBLICATIONS

Sugiyama, et. al., "Adaptive Transform Coding With an Adaptive Block Size (ATC-ABS)", IEEE Intl. Conf on Acoust., Speech, and Sig. Proc., Apr. 1990.

Laroche, et al., "New phase-Vocoder Techniques for Pitch-Shifting, Harmonizing and Other Exotic Effects," Proc. IEEE Workshop on Applications of Signal Processing to Audio and Acoustics, New Paltz, New York, Oct. 1999, pp. 91-94.

Gustafsson H et al., "Speech Bandwidth Extension", Aug. 22, 2001, pp. 809-812.

(Continued)

*Primary Examiner* — Eric Yen

(57) ABSTRACT

An audio signal is conveyed more efficiently by transmitting or recording a baseband of the signal with an estimated spectral envelope and a noise-blending parameter derived from a measure of the signal's noise-like quality. The signal is reconstructed by translating spectral components of the baseband signal to frequencies outside the baseband, adjusting phase of the regenerated components to maintain phase coherency, adjusting spectral shape according to the estimated spectral envelope, and adding noise according to the noise-blending parameter. Preferably, the transmitted or recorded signal also includes an estimated temporal envelope that is used to adjust the temporal shape of the reconstructed signal.

18 Claims, 11 Drawing Sheets

U.S. PATENT DOCUMENTS

| | | | | |
|---|---|---|---|---|
| 3,995,115 | A | 11/1976 | Kelly | |
| 4,051,331 | A | 9/1977 | Strong et al. | |
| 4,232,194 | A | 11/1980 | Adams | |
| 4,419,544 | A | 12/1983 | Adelman | |
| 4,610,022 | A | 9/1986 | Kitayama et al. | |
| 4,667,340 | A | 5/1987 | Arjmand et al. | |
| 4,757,517 | A | 7/1988 | Yatsuzuka | |
| 4,776,014 | A | 10/1988 | Zinser, Jr. | |
| 4,790,016 | A | 12/1988 | Mazor | |
| 4,866,777 | A | 9/1989 | Mulla et al. | |
| 4,885,790 | A | 12/1989 | McAulay et al. | |
| 4,914,701 | A | 4/1990 | Zibman | |
| 4,935,963 | A | 6/1990 | Jain | |
| 5,001,758 | A | 3/1991 | Galand | |
| 5,054,072 | A | 10/1991 | McAulay et al. | |
| 5,054,075 | A | 10/1991 | Hong et al. | |
| 5,109,417 | A | 4/1992 | Davidson | |
| 5,127,054 | A | 6/1992 | Hong et al. | |
| 5,327,457 | A | 7/1994 | Leopold | |
| 5,394,473 | A | 2/1995 | Davidson | |
| 5,579,434 | A * | 11/1996 | Kudo et al. | 704/219 |
| 5,583,962 | A | 12/1996 | Todd | |
| 5,587,998 | A | 12/1996 | Velardo, Jr. et al. | |
| 5,623,577 | A | 4/1997 | Fielder | |
| 5,636,324 | A | 6/1997 | Teh et al. | |
| 5,729,607 | A | 3/1998 | DeFries et al. | |
| 5,744,739 | A | 4/1998 | Jenkins | |
| 5,812,947 | A | 9/1998 | Dent | |
| 5,937,378 | A | 8/1999 | Serizawa | |
| 5,950,156 | A | 9/1999 | Ueno et al. | |
| 5,953,697 | A | 9/1999 | Lin et al. | |
| 6,019,607 | A | 2/2000 | Jenkins et al. | |
| 6,104,996 | A | 8/2000 | Yin | |
| 6,167,375 | A | 12/2000 | Miseki et al. | |
| 6,169,813 | B1 | 1/2001 | Richardson et al. | |
| 6,173,062 | B1 | 1/2001 | Dibachi et al. | |
| 6,178,217 | B1 | 1/2001 | Defries et al. | |
| 6,336,092 | B1 | 1/2002 | Gibson et al. | |
| 6,341,165 | B1 | 1/2002 | Gbur et al. | |
| 6,424,939 | B1 | 7/2002 | Herre et al. | |
| 6,487,535 | B1 | 11/2002 | Smyth et al. | |
| 6,675,144 | B1 | 1/2004 | Tucker et al. | |
| 6,680,972 | B1 | 1/2004 | Ekstrand | |
| 6,941,263 | B2 | 9/2005 | Wang et al. | |
| 7,219,065 | B1 | 5/2007 | Vandali et al. | |
| 7,379,866 | B2 * | 5/2008 | Gao | 704/220 |
| 7,483,758 | B2 | 1/2009 | Liljeryd | |
| 7,831,434 | B2 * | 11/2010 | Mehrotra et al. | 704/500 |
| 8,015,368 | B2 * | 9/2011 | Sharma et al. | 711/147 |
| 8,069,050 | B2 * | 11/2011 | Thumpudi et al. | 704/500 |
| 8,086,451 | B2 * | 12/2011 | Hetherington et al. | 704/225 |
| 2003/0158726 | A1 | 8/2003 | Philippe | |
| 2005/0065792 | A1 * | 3/2005 | Gao | 704/233 |

FOREIGN PATENT DOCUMENTS

| | | |
|---|---|---|
| WO | 9857436 | 12/1998 |
| WO | 0045379 | 8/2000 |
| WO | 0180223 | 10/2001 |
| WO | 0191111 | 11/2001 |
| WO | 0241302 | 5/2002 |

OTHER PUBLICATIONS

Liu, Chi-Min, et al.; "Design of the Coupling Schemes for the Dolby AC-3 Coder in Stereo Coding", Int. Conf. on Consumer Electronics, ICCE, Jun. 2, 1998, IEEE XP010283089; pp. 328-329.

Makhoul, et al.; "High-Frequency Regeneration in Speech Coding Systems," IEEE Int. Conf. on Speech and Sig. Proc., Apr. 1979, pp. 428-431.

Galand, et al.; "High-Frequency Regeneration of Base-Band Vocoders by Multi-Pulse Excitation," IEEE Int. Conf. on Speech and Sig. Proc., Apr. 1987, pp. 1934-1937.

Hans, M., et al., "An MPEG Audio Layered Transcoder," 105th AES Convention, San Franciso, Sep. 1998, pp. 1-18.

Grauel, Christoph, "Sub-Band Coding with Adaptive Bit Allocation," Signal Processing, vol. 2 No. 1, Jan. 1980, No. Holland Publishing Co., ISSN 0 165-1684, pp. 23-30.

Herre, et al., "Extending the MPEG-4 AAC Codec by Perceptual Noise Substitution," 104th AES Convention, May 1998, preprint 4720.

Edler, "Codierung von Audiosignalen mit uberlappender Transformation and Adaptivene Fensterfunktionen," Frequenz, 1989, vol. 43, pp. 252-256.

Rabiner, et al., "Digital Processing of Speech Signals,": Prentice-Hall, 1978, pp. 396-404.

Zinser, "An Efficient, Pitch-Aligned High-Frequency Regeneration Technique for RELP Vocoders," IEEE Int. Conf. on Speech and Sig. Proc., Mar. 1985, p. 969-972.

Atkinson, I. A.; et al., "Time Envelope LP Vocoder: A New Coding Technique at Very Low Bit Rates," 4.sup.th European Conference on Speech Communication and Technology, ESCA EUROSPEECH '95 Madrid, Sep. 1995, ISSN 1018-4074, pp. 241-244.

Karsson G. et al., "Extension of Finite Length Signals for Sub-Band Coding" Signals Processing, Elsevier Science Publishers B. V. Amsterdam, NL LNKD0DO:10.1016/0165-1684(89)90019-4, vol. 17, No. 2, Jun. 1, 1989, pp. 161-168.

Herre, et al., "Enhancing the Performance of Perceptual Audio Coders by Using Temporal Noise Shaping (TNS)," 101st AES Convention, Nov. 1996, preprint 4384.

Nakajima, Y., et al. "MPEG Audio Bit Rate Scaling on Coded Data Domain" Acoustics, Speech and Signal Processing, 1998, Proceedings of the 1998 IEEE Int'l Conf. on Seattle, WA, May 12-15, 1998, New York IEEE pp. 3669-3672.

Bosi, et al., "ISO/IEC MPEG-2 Advanced Audio Coding," J. Audio Eng. Soc., vol. 45, No. 10, Oct. 1997, pp. 789-814.

Stott, "DRM—key technical features," EBU Technical Review, Mar. 2001, pp. 1-24.

Herre, et al., "Exploiting Both Time and Frequency Structure in a System That Uses an Analysis/Synthesis Filterbank with High Frequency Resolution," 103rd AES Convention, Sep. 1997, preprint 4519.

ATSC Standard: Digital Audio Compression (AC-3), Rev. A, Aug. 20, 2001, Sections 1-4, 6, 7.3, 8.

* cited by examiner

RECONSTRUCTING AN AUDIO SIGNAL BY SPECTRAL COMPONENT REGENERATION AND NOISE BLENDING

TECHNICAL FIELD

The present invention relates generally to the transmission and recording of audio signals. More particularly, the present invention provides for a reduction of information required to transmit or store a given audio signal while maintaining a given level of perceived quality in the output signal.

BACKGROUND ART

Many communications systems face the problem that the demand for information transmission and storage capacity often exceeds the available capacity. As a result there is considerable interest among those in the fields of broadcasting and recording to reduce the amount of information required to transmit or record an audio signal intended for human perception without degrading its subjective quality. Similarly there is a need to improve the quality of the output signal for a given bandwidth or storage capacity.

Two principle considerations drive the design of systems intended for audio transmission and storage: the need to reduce information requirements and the need to ensure a specified level of perceptual quality in the output signal. These two considerations conflict in that reducing the quantity of information transmitted can reduce the perceived quality of the output signal. While objective constraints such as data rate are usually imposed by the communications system itself, subjective perceptual requirements are usually dictated by the application.

Traditional methods for reducing information requirements involve transmitting or recording only a selected portion of the input signal, with the remainder being discarded. Preferably, only that portion deemed to be either redundant or perceptually irrelevant is discarded. If additional reduction is required, preferably only a portion of the signal deemed to have the least perceptual significance is discarded.

Speech applications that emphasize intelligibility over fidelity, such as speech coding, may transmit or record only a portion of a signal, referred to herein as a "baseband signal", which contains only the perceptually most relevant portions of the signal's frequency spectrum. A receiver can regenerate the omitted portion of the voice signal from information contained within that baseband signal. The regenerated signal generally is not perceptually identical to the original, but for many applications an approximate reproduction is sufficient. On the other hand, applications designed to achieve a high degree of fidelity, such as high-quality music applications, generally require a higher quality output signal. To obtain a higher quality output signal, it is generally necessary to transmit a greater amount of information or to utilize a more sophisticated method of generating the output signal.

One technique used in connection with speech signal decoding is known as high frequency regeneration ("HFR"). A baseband signal containing only low-frequency components of a signal is transmitted or stored. A receiver regenerates the omitted high-frequency components based on the contents of the received baseband signal and combines the baseband signal with the regenerated high-frequency components to produce an output signal. Although the regenerated high-frequency components are generally not identical to the high-frequency components in the original signal, this technique can produce an output signal that is more satisfactory than other techniques that do not use HFR. Numerous variations of this technique have been developed in the area of speech encoding and decoding. Three common methods used for HFR are spectral folding, spectral translation, and rectification. A description of these techniques can be found in Makhoul and Berouti, "High-Frequency Regeneration in Speech Coding Systems", *ICASSP* 1979 *IEEE International Conf. on Acoust., Speech and Signal Proc.*, Apr. 2-4, 1979.

Although simple to implement, these HFR techniques are usually not suitable for high quality reproduction systems such as those used for high quality music. Spectral folding and spectral translation can produce undesirable background tones. Rectification tends to produce results that are perceived to be harsh. The inventors have noted that in many cases where these techniques have produced unsatisfactory results, the techniques were used in bandlimited speech coders where HFR was restricted to the translation of components below 5 kHz.

The inventors have also noted two other problems that can arise from the use of HFR techniques. The first problem is related to the tone and noise characteristics of signals, and the second problem is related to the temporal shape or envelope of regenerated signals. Many natural signals contain a noise component that increases in magnitude as a function of frequency. Known HFR techniques regenerate high-frequency components from a baseband signal but fail to reproduce a proper mix of tone-like and noise-like components in the regenerated signal at the higher frequencies. The regenerated signal often contains a distinct high-frequency "buzz" attributable to the substitution of tone-like components in the baseband for the original, more noise-like high-frequency components. Furthermore, known HFR techniques fail to regenerate spectral components in such a way that the temporal envelope of the regenerated signal preserves or is at least similar to the temporal envelope of the original signal.

A number of more sophisticated HFR techniques have been developed that offer improved results; however, these techniques tend to be either speech specific, relying on characteristics of speech that are not suitable for music and other forms of audio, or require extensive computational resources that cannot be implemented economically.

DISCLOSURE OF INVENTION

It is an object of the present invention to provide for the processing of audio signals to reduce the quantity of information required to represent a signal during transmission or storage while maintaining the perceived quality of the signal. Although the present invention is particularly directed toward the reproduction of music signals, it is also applicable to a wide range of audio signals including voice.

According to an aspect of the present invention in a receiver, an audio signal is reconstructed by receiving a signal containing data representing a baseband signal derived from an audio signal, a noise blending parameter and an estimated spectral envelope, obtaining from the data a frequency-domain representation of the baseband signal, the frequency-domain representation comprising baseband spectral components, generating a noise signal comprising noise-signal spectral components that are weighted in amplitude by a noise blending function that is a function of frequency and the noise blending parameter and that gives greater weight to spectral components at higher frequencies, generating a regenerated signal comprising regenerated-signal spectral components copied from the baseband spectral components in a circular manner into an interval of frequencies and weighted in amplitude by an inverse of the noise blending function, generating noisy regenerated spectral components from a combination of the noise-signal spectral components and the regenerated-signal spectral components, wherein amplitudes of the noisy regenerated spectral components are weighted according to the estimated spectral envelope, and generating the reconstructed signal from a time-domain representation of the baseband spectral components combined with the noisy regenerated spectral components.

Other aspects of the present invention are described below and set forth in the claims.

The various features of the present invention and its preferred implementations may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

A. Overview

Figure 1:
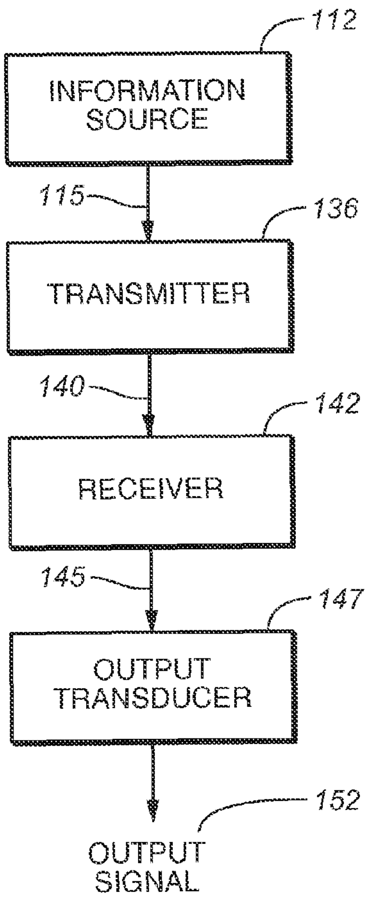
FIG. 1 illustrates major components in a communications system.

FIG. 1 illustrates major components in one example of a communications system. An information source 112 generates an audio signal along path 115 that represents essentially any type of audio information such as speech or music. A transmitter 136 receives the audio signal from path 115 and processes the information into a form that is suitable for transmission through the channel 140. The transmitter 136 may prepare the signal to match the physical characteristics of the channel 140. The channel 140 may be a transmission path such as electrical wires or optical fibers, or it may be a wireless communication path through space. The channel 140 may also include a storage device that records the signal on a storage medium such as a magnetic tape or disk, or an optical disc for later use by a receiver 142. The receiver 142 may perform a variety of signal processing functions such as demodulation or decoding of the signal received from the channel 140. The output of the receiver 142 is passed along a path 145 to a transducer 147, which converts it into an output signal 152 that is suitable for the user. In a conventional audio playback system, for example, loudspeakers serve as transducers to convert electrical signals into acoustic signals.

Communication systems, which are restricted to transmitting over a channel that has a limited bandwidth or recording on a medium that has limited capacity, encounter problems when the demand for information exceeds this available bandwidth or capacity. As a result there is a continuing need in the fields of broadcasting and recording to reduce the amount of information required to transmit or record an audio signal intended for human perception without degrading its subjective quality. Similarly there is a need to improve the quality of the output signal for a given transmission bandwidth or storage capacity.

A technique used in connection with speech coding is known as high-frequency regeneration ("HFR"). Only a baseband signal containing low-frequency components of a speech signal are transmitted or stored. The receiver 142 regenerates the omitted high-frequency components based on the contents of the received baseband signal and combines the baseband signal with the regenerated high-frequency components to produce an output signal. In general, however, known HFR techniques produce regenerated high-frequency components that are easily distinguishable from the high-frequency components in the original signal. The present invention provides an improved technique for spectral component regeneration that produces regenerated spectral components perceptually more similar to corresponding spectral components in the original signal than is provided by other known techniques. It is important to note that although the techniques described herein are sometimes referred to as high-frequency regeneration, the present invention is not limited to the regeneration of high-frequency components of a signal. The techniques described below may also be utilized to regenerate spectral components in any part of the spectrum.

B. Transmitter

Figure 2:
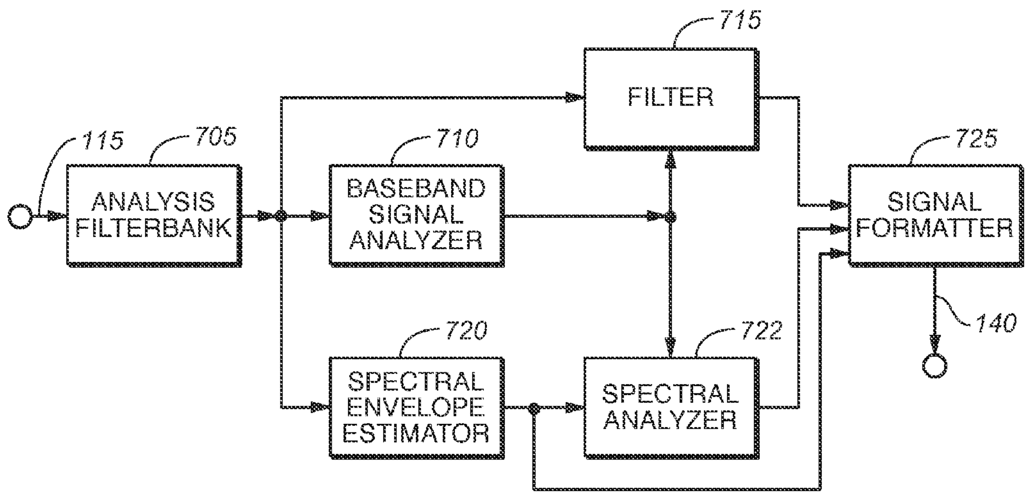
FIG. 2 is a block diagram of a transmitter.

FIG. 2 is a block diagram of the transmitter 136 according to one aspect of the present invention. An input audio signal is received from path 115 and processed by an analysis filterbank 705 to obtain a frequency-domain representation of the input signal. A baseband signal analyzer 710 determines which spectral components of the input signal are to be discarded. A filter 715 removes the spectral components to be discarded to produce a baseband signal consisting of the remaining spectral components. A spectral envelope estimator 720 obtains an estimate of the input signal's spectral envelope. A spectral analyzer 722 analyzes the estimated spectral envelope to determine noise-blending parameters for the signal. A signal formatter 725 combines the estimated spectral envelope information, the noise-blending parameters, and the baseband signal into an output signal having a form suitable for transmission or storage.

1. Analysis Filterbank

The analysis filterbank 705 may be implemented by essentially any time-domain to frequency-domain transform. The transform used in a preferred implementation of the present invention is described in Princen, Johnson and Bradley, "Subband/Transform Coding Using Filter Bank Designs Based on Time Domain Aliasing Cancellation," *ICASSP* 1987 *Conf. Proc.*, May 1987, pp. 2161-64. This transform is the time-domain equivalent of an oddly-stacked critically sampled single-sideband analysis-synthesis system with time-domain aliasing cancellation and is referred to herein as "O-TDAC".

According to the O-TDAC technique, an audio signal is sampled, quantized and grouped into a series of overlapped time-domain signal sample blocks. Each sample block is weighted by an analysis window function. This is equivalent to a sample-by-sample multiplication of the signal sample block. The O-TDAC technique applies a modified Discrete Cosine Transform ("DCT") to the weighted time-domain signal sample blocks to produce sets of transform coefficients, referred to herein as "transform blocks". To achieve critical sampling, the technique retains only half of the spectral coefficients prior to transmission or storage. Unfortunately, the retention of only half of the spectral coefficients causes a complementary inverse transform to generate time-domain aliasing components. The O-TDAC technique can cancel the aliasing and accurately recover the input signal. The length of the blocks may be varied in response to signal characteristics using techniques that are known in the art; however, care should be taken with respect to phase coherency for reasons that are discussed below. Additional details of the O-TDAC technique may be obtained by referring to U.S. Pat. No. 5,394,473.

To recover the original input signal blocks from the transform blocks, the O-TDAC technique utilizes an inverse modified DCT. The signal blocks produced by the inverse transform are weighted by a synthesis window function, overlapped and added to recreate the input signal. To cancel the time-domain aliasing and accurately recover the input signal, the analysis and synthesis windows must be designed to meet strict criteria.

In one preferred implementation of a system for transmitting or recording an input digital signal sampled at a rate of 44.1 kilosamples/second, the spectral components obtained from the analysis filterbank 705 are divided into four subbands having ranges of frequencies as shown in Table I.

TABLE I

| Band | Frequency Range (kHz) |
|---|---|
| 0 | 0.0 to 5.5 |
| 1 | 5.5 to 11.0 |
| 2 | 11.0 to 16.5 |
| 3 | 16.5 to 22.0 |

2. Baseband Signal Analyzer

The baseband signal analyzer 710 selects which spectral components to discard and which spectral components to retain for the baseband signal. This selection can vary depending on input signal characteristics or it can remain fixed according to the needs of an application; however, the inventors have determined empirically that the perceived quality of an audio signal deteriorates if one or more of the signal's fundamental frequencies are discarded. It is therefore preferable to preserve those portions of the spectrum that contain the signal's fundamental frequencies. Because the fundamental frequencies of voice and most natural musical instruments are generally no higher than about 5 kHz, a preferred implementation of the transmitter 136 intended for music applications uses a fixed cutoff frequency at or around 5 kHz and discards all spectral components above that frequency. In the case of a fixed cutoff frequency, the baseband signal analyzer need not do anything more than provide the fixed cutoff frequency to the filter 715 and the spectral analyzer 722. In an alternative implementation, the baseband signal analyzer 710 is eliminated and the filter 715 and the spectral analyzer 722 operate according to the fixed cutoff frequency. In the subband structure shown above in Table I, for example, the spectral components in only subband 0 are retained for the baseband signal. This choice is also suitable because the human ear cannot easily distinguish differences in pitch above 5 kHz and therefore cannot easily discern inaccuracies in regenerated components above this frequency.

The choice of cutoff frequency affects the bandwidth of the baseband signal, which in turn influences a tradeoff between the information capacity requirements of the output signal generated by the transmitter 136 and the perceived quality of the signal reconstructed by the receiver 142. The perceived quality of the signal reconstructed by the receiver 142 is influenced by three factors that are discussed in the following paragraphs.

The first factor is the accuracy of the baseband signal representation that is transmitted or stored. Generally, if the bandwidth of a baseband signal is held constant, the perceived quality of a reconstructed signal will increase as the accuracy of the baseband signal representation is increased. Inaccuracies represent noise that will be audible in the reconstructed signal if the inaccuracies are large enough. The noise will degrade both the perceived quality of the baseband signal and the spectral components that are regenerated from the baseband signal. In an exemplary implementation, the baseband signal representation is a set of frequency-domain transform coefficients. The accuracy of this representation is controlled by the number of bits that are used to express each transform coefficient. Coding techniques can be used to convey a given level of accuracy with fewer bits; however, a basic tradeoff between baseband signal accuracy and information capacity requirements exists for any given coding technique.

The second factor is the bandwidth of the baseband signal that is transmitted or stored. Generally, if the accuracy of the baseband signal representation is held constant, the perceived quality of a reconstructed signal will increase as the bandwidth of the baseband signal is increased. The use of wider bandwidth baseband signals allows the receiver 142 to confine regenerated spectral components to higher frequencies where the human auditory system is less sensitive to differences in temporal and spectral shape. In the exemplary implementation mentioned above, the bandwidth of the baseband signal is controlled by the number of transform coefficients in the representation. Coding techniques can be used to convey a given number of coefficients with fewer bits; however, a basic tradeoff between baseband signal bandwidth and information capacity requirements exists for any given coding technique.

The third factor is the information capacity that is required to transmit or store the baseband signal representation. If the information capacity requirement is held constant, the baseband signal accuracy will vary inversely with the bandwidth of the baseband signal. The needs of an application will generally dictate a particular information capacity requirement for the output signal that is generated by the transmitter 136. This capacity must be allocated to various portions of the output signal such as a baseband signal representation and an estimated spectral envelope. The allocation must balance the needs of a number of conflicting interests that are well known for communication systems. Within this allocation, the bandwidth of the baseband signal should be chosen to balance a tradeoff with coding accuracy to optimize the perceived quality of the reconstructed signal.

3. Spectral Envelope Estimator

The spectral envelope estimator 720 analyzes the audio signal to extract information regarding the signal's spectral envelope. If available information capacity permits, an implementation of the transmitter 136 preferably obtains an estimate of a signal's spectral envelope by dividing the signal's spectrum into frequency bands with bandwidths approximating the human ear's critical bands, and extracting information regarding the signal magnitude in each band. In most applications having limited information capacity, however, it is preferable to divide the spectrum into a smaller number of subbands such as the arrangement shown above in Table I. Other variations may be used such as calculating a power spectral density, or extracting the average or maximum amplitude in each band. More sophisticated techniques can provide higher quality in the output signal but generally require greater computational resources. The choice of method used to obtain an estimated spectral envelope generally has practical implications because it generally affects the perceived quality of the communication system; however, the choice of method is not critical in principle. Essentially any technique may be used as desired.

In one implementation using the subband structure shown in Table I, the spectral envelope estimator 720 obtains an estimate of the spectral envelope only for subbands 0, 1 and 2. Subband 3 is excluded to reduce the amount of information required to represent the estimated spectral envelope.

4. Spectral Analyzer

The spectral analyzer 722 analyzes the estimated spectral envelope received from the spectral envelope estimator 720 and information from the baseband signal analyzer 710, which identifies the spectral components to be discarded from a baseband signal, and calculates one more noise-blending parameters to be used by the receiver 142 to generate a noise component for translated spectral components. A preferred implementation minimizes data rate requirements by computing and transmitting a single noise-blending parameter to be applied by the receiver 142 to all translated components. Noise-blending parameters can be calculated by any one of a number of different methods. A preferred method derives a single noise-blending parameter equal to a spectral flatness measure that is calculated from the ratio of the geometric mean to the arithmetic mean of the short-time power spectrum. The ratio gives a rough indication of the flatness of the spectrum. A higher spectral flatness measure, which indicates a flatter spectrum, also indicates a higher noise-blending level is appropriate.

In an alternative implementation of the transmitter 136, the spectral components are grouped into multiple subbands such as those shown in Table I, and the transmitter 136 transmits a noise-blending parameter for each subband. This more accurately defines the amount of noise to be mixed with the translated frequency content but it also requires a higher data rate to transmit the additional noise-blending parameters.

5. Baseband Signal Filter

Figure 3A:
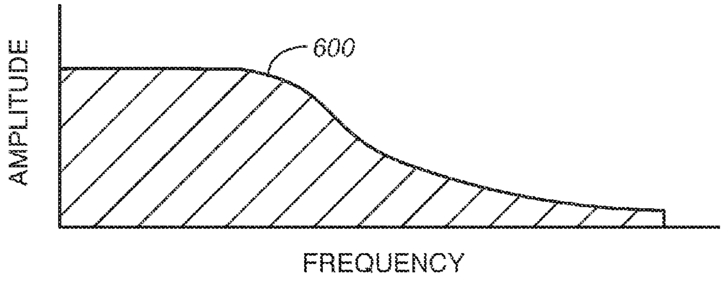
FIGS. 3A and 3B are hypothetical graphical illustrations of an audio signal and a corresponding baseband signal.
Figure 3B:
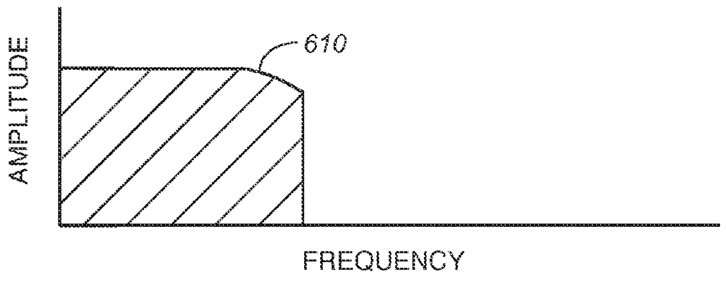

The filter 715 receives information from the baseband signal analyzer 710, which identifies the spectral components that are selected to be discarded from a baseband signal, and eliminates the selected frequency components to obtain a frequency-domain representation of the baseband signal for transmission or storage. FIGS. 3A and 3B are hypothetical graphical illustrations of an audio signal and a corresponding baseband signal. FIG. 3A shows the spectral envelope of a frequency-domain representation 600 of a hypothetical audio signal. FIG. 3B shows the spectral envelope of the baseband signal 610 that remains after the audio signal is processed to eliminate selected high-frequency components.

The filter 715 may be implemented in essentially any manner that effectively removes the frequency components that are selected for discarding. In one implementation, the filter 715 applies a frequency-domain window function to the frequency-domain representation of the input audio signal. The shape of the window function is selected to provide an appropriate trade off between frequency selectivity and attenuation against time-domain effects in the output audio signal that is ultimately generated by the receiver 142.

6. Signal Formatter

The signal formatter 725 generates an output signal along communication channel 140 by combining the estimated spectral envelope information, the one or more noise-blending parameters, and a representation of the baseband signal into an output signal having a form suitable for transmission or storage. The individual signals may be combined in essentially any manner. In many applications, the formatter 725 multiplexes the individual signals into a serial bit stream with appropriate synchronization patterns, error detection and correction codes, and other information that is pertinent either to transmission or storage operations or to the application in which the audio information is used. The signal formatter 725 may also encode all or portions of the output signal to reduce information capacity requirements, to provide security, or to put the output signal into a form that facilitates subsequent usage.

C. Receiver

Figure 4:
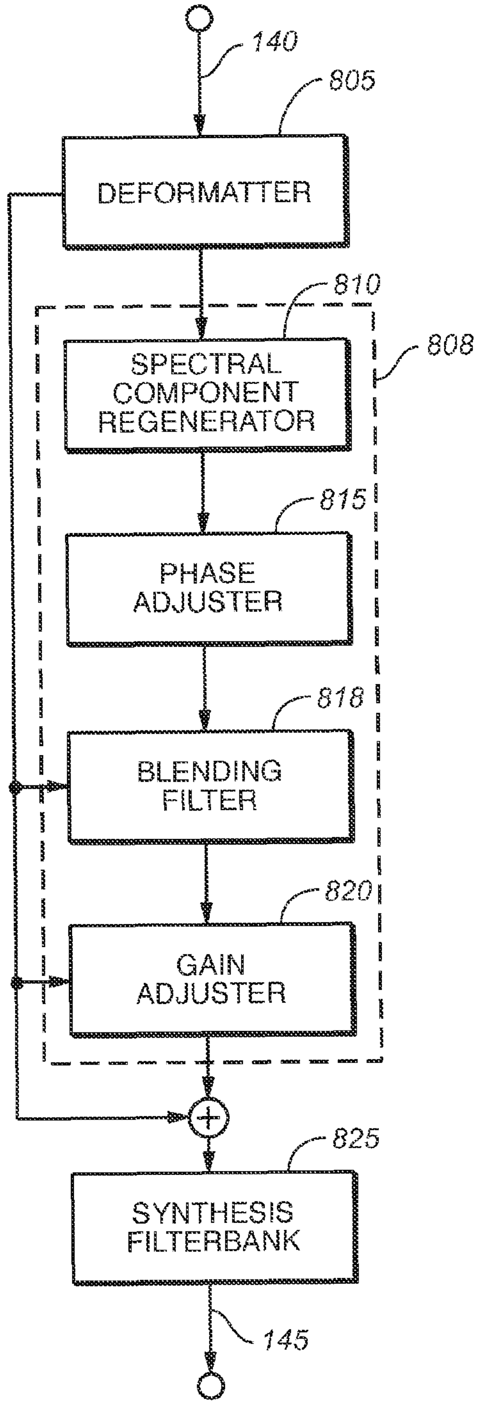
FIG. 4 is a block diagram of a receiver.

FIG. 4 is a block diagram of the receiver 142 according to one aspect of the present invention. A deformatter 805 receives a signal from the communication channel 140 and obtains from this signal a baseband signal, estimated spectral envelope information and one or more noise-blending parameters. These elements of information are transmitted to a signal processor 808 that comprises a spectral regenerator 810, a phase adjuster 815, a blending filter 818 and a gain adjuster 820. The spectral component regenerator 810 determines which spectral components are missing from the baseband signal and regenerates them by translating all or at least some spectral components of the baseband signal to the locations of the missing spectral components. The translated components are passed to the phase adjuster 815, which adjusts the phase of one or more spectral components within the combined signal to ensure phase coherency. The blending filter 818 adds one or more noise components to the translated components according to the one or more noise-blending parameters received with the baseband signal. The gain adjuster 820 adjusts the amplitude of spectral components in the regenerated signal according to the estimated spectral envelope information received with the baseband signal. The translated and adjusted spectral components are combined with the baseband signal to produce a frequency-domain representation of the output signal. A synthesis filterbank 825 processes the signal to obtain a time-domain representation of the output signal, which is passed along path 145.

1. Deformatter

The deformatter 805 processes the signal received from communication channel 140 in a manner that is complementary to the formatting process provided by the signal formatter 725. In many applications, the deformatter 805 receives a serial bit stream from the channel 140, uses synchronization patterns within the bit stream to synchronize its processing, uses error correction and detection codes to identify and rectify errors that were introduced into the bit stream during transmission or storage, and operates as a demultiplexer to extract a representation of the baseband signal, the estimated spectral envelope information, one or more noise-blending parameters, and any other information that may be pertinent to the application. The deformatter 805 may also decode all or portions of the serial bit stream to reverse the effects of any coding provided by the transmitter 136. A frequency-domain representation of the baseband signal is passed to the spectral component regenerator 810, the noise-blending parameters are passed to the blending filter 818, and the spectral envelope information is passed to the gain adjuster 820.

2. Spectral Component Regenerator

The spectral component regenerator 810 regenerates missing spectral components by copying or translating all or at least some of the spectral components of the baseband signal to the locations of the missing components of the signal. Spectral components may be copied into more than one interval of frequencies, thereby allowing an output signal to be generated with a bandwidth greater than twice the bandwidth of the baseband signal.

In an implementation of the receiver 142 that uses only subbands 0 and 1 shown above in Table I, the baseband signal contains no spectral components above a cutoff frequency at or about 5.5 kHz. Spectral components of the baseband signal are copied or translated to a range of frequencies from about 5.5 kHz to about 11.0 kHz. If a 16.5 kHz bandwidth is desired, for example, the spectral components of the baseband signal can also be translated into ranges of frequencies from about 11.0 kHz to about 16.5 kHz. Generally, the spectral components are translated into non-overlapping frequency ranges such that no gap exists in the spectrum including the baseband signal and all copied spectral components; however, this feature is not essential. Spectral components may be translated into overlapping frequency ranges and/or into frequency ranges with gaps in the spectrum in essentially any manner as desired.

The choice of which spectral components should be copied can be varied to suit the particular application. For example, spectral components that are copied need not start at the lower edge of the baseband and need not end at the upper edge of the baseband. The perceived quality of the signal reconstructed by the receiver 142 can sometimes be improved by excluding fundamental frequencies of voice and instruments and copying only harmonics. This aspect is incorporated into one implementation by excluding from translation those baseband spectral components that are below about 1 kHz. Referring to the subband structure shown above in Table I as an example, only spectral components from about 1 kHz to about 5.5 kHz are translated.

If the bandwidth of all spectral components to be regenerated is wider than the bandwidth of the baseband spectral components to be copied, the baseband spectral components may be copied in a circular manner starting with the lowest frequency component up to the highest frequency component and, if necessary, wrapping around and continuing with the lowest frequency component. For example, referring to the subband structure shown in Table I, if only baseband spectral components from about 1 kHz to 5.5 kHz are to be copied and spectral components are to be regenerated for subbands 1 and 2 that span frequencies from about 5.5 kHz to 16.5 kHz, then baseband spectral components from about 1 kHz to 5.5 kHz are copied to respective frequencies from about 5.5 kHz to 10 kHz, the same baseband spectral components from about 1 kHz to 5.5 kHz are copied again to respective frequencies from about 10 kHz to 14.5 kHz, and the baseband spectral component from about 1 kHz to 3 kHz are copied to respective frequencies from about 14.5 kHz to 16.5 kHz. Alternatively, this copying process can be performed for each individual subband of regenerated components by copying the lowest-frequency component of the baseband to the lower edge of the respective subband and continuing through the baseband spectral components in a circular manner as necessary to complete the translation for that subband.

Figure 5A:
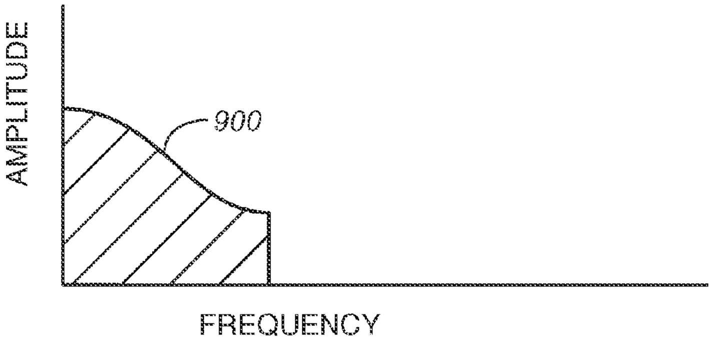
FIGS. 5A-5D are hypothetical graphical illustrations of a baseband signal and signals generated by translation of the baseband signal.
Figure 5B:
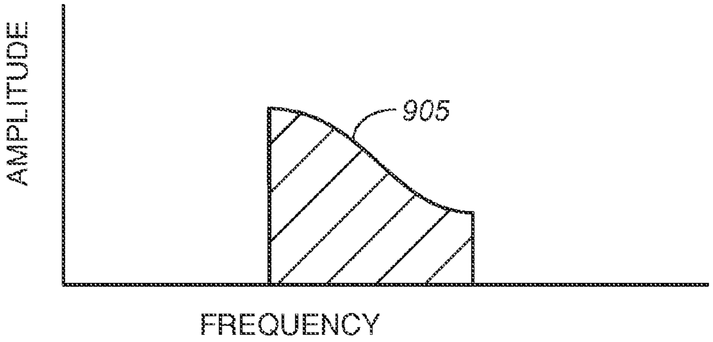
Figure 5C:
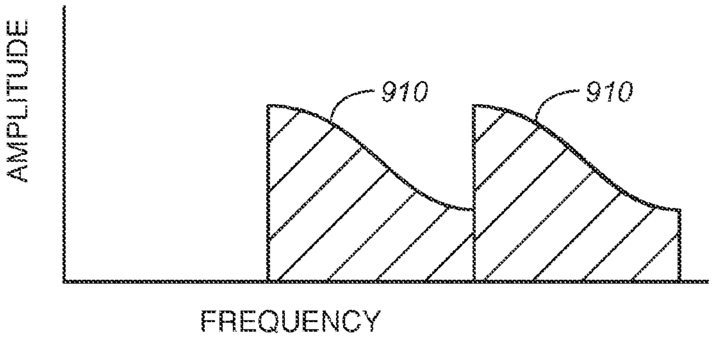
Figure 5D:
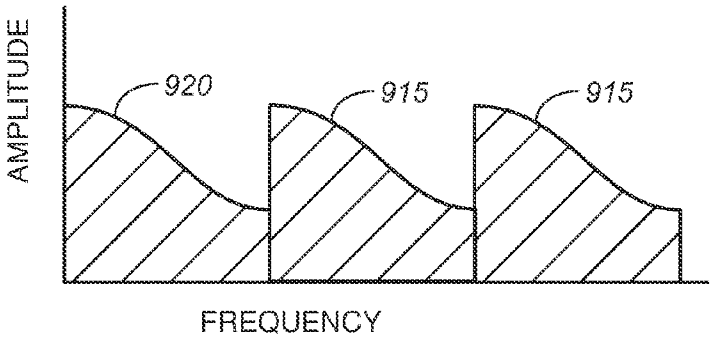

FIGS. 5A through 5D are hypothetical graphical illustrations of the spectral envelope of a baseband signal and the spectral envelope of signals generated by translation of spectral components within the baseband signal. FIG. 5A shows a hypothetical decoded baseband signal 900. FIG. 5B shows spectral components of the baseband signal 905 translated to higher frequencies. FIG. 5C shows the baseband signal components 910 translated multiple times to higher frequencies. FIG. 5D shows a signal resulting from the combination of the translated components 915 and the baseband signal 920.

3. Phase Adjuster

The translation of spectral components may create discontinuities in the phase of the regenerated components. The O-TDAC transform implementation described above, for example, as well as many other possible implementations, provides frequency-domain representations that are arranged in blocks of transform coefficients. The translated spectral components are also arranged in blocks. If spectral components regenerated by translation have phase discontinuities between successive blocks, audible artifacts in the output audio signal are likely to occur.

The phase adjuster 815 adjusts the phase of each regenerated spectral component to maintain a consistent or coherent phase. In an implementation of the receiver 142 which employs the O-TDAC transform described above, each of the regenerated spectral components is multiplied by the complex value $e^{j\Delta\omega}$, where $\Delta\omega$ represents the frequency interval each respective spectral component is translated, expressed as the number of transform coefficients that correspond to that frequency interval. For example, if a spectral component is translated to the frequency of the adjacent component, the translation interval $\Delta\omega$ is equal to one. Alternative implementations may require different phase adjustment techniques appropriate to the particular implementation of the synthesis filterbank 825.

The translation process may be adapted to match the regenerated components with harmonics of significant spectral components within the baseband signal. Two ways in which translation may be adapted is by changing either the specific spectral components that are copied, or by changing the amount of translation. If an adaptive process is used, special care should be taken with regard to phase coherency if spectral components are arranged in blocks. If the regenerated spectral components are copied from different base components from block to block or if the amount of frequency translation is changed from block to block, it is very likely the regenerated components will not be phase coherent. It is possible to adapt the translation of spectral components but care must be taken to ensure the audibility of artifacts caused by phase incoherency is not significant. A system that employs either multiple-pass techniques or look-ahead techniques could identify intervals during which translation could be adapted. Blocks representing intervals of an audio signal in which the regenerated spectral components are deemed to be inaudible are usually good candidates for adapting the translation process.

4. Noise Blending Filter

The blending filter 818 generates a noise component for the translated spectral components using the noise-blending parameters received from the deformatter 805. The blending filter 818 generates a noise signal, computes a noise-blending function using the noise-blending parameters and utilizes the noise-blending function to combine the noise signal with the translated spectral components.

A noise signal can be generated by any one of a variety of ways. In a preferred implementation, a noise signal is produced by generating a sequence of random numbers having a distribution with zero mean and variance of one. The blending filter 818 adjusts the noise signal by multiplying the noise signal by the noise-blending function. If a single noise-blending parameter is used, the noise-blending function generally should adjust the noise signal to have higher amplitude at higher frequencies. This follows from the assumptions discussed above that voice and natural musical instrument signals tend to contain more noise at higher frequencies. In a preferred implementation when spectral components are translated to higher frequencies, a noise-blending function has a maximum amplitude at the highest frequency and decays smoothly to a minimum value at the lowest frequency at which noise is blended.

One implementation uses a noise-blending function N(k) as shown in the following expression:

$$N(k) = \max\left(\frac{k - k_{MIN}}{k_{MAX} - k_{MIN}} + B - 1,\ 0\right) \text{ for } k_{MIN} \le k \le k_{MAX} \tag{1}$$

where max(x,y)=the larger of x and y;

B=a noise-blending parameter based on SFM;

k=the index of regenerated spectral components;

$k_{MAX}$=highest frequency for spectral component regeneration; and $k_{MIN}$=lowest frequency for spectral component regeneration.

In this implementation, the value of B varies from zero to one, where one indicates a flat spectrum that is typical of a noise-like signal and zero indicates a spectral shape that is not flat and is typical of a tone-like signal. The value of the quotient in equation 1 varies from zero to one as k increases from $k_{MIN}$ to $k_{MAX}$. If B is equal to zero, the first term in the "max" function varies from negative one to zero; therefore, N(k) will be equal to zero throughout the regenerated spectrum and no noise is added to regenerated spectral components. If B is equal to one, the first term in the "max" function varies from zero to one; therefore, N(k) increases linearly from zero at the lowest regenerated frequency $k_{MIN}$ up to a value equal to one at the maximum regenerated frequency $k_{MAX}$. If B has a value between zero and one, N(k) is equal to zero from $k_{MIN}$ up to some frequency between $k_{MIN}$ and $k_{MAX}$, and increases linearly for the remainder of the regenerated spectrum. The amplitude of the regenerated spectral components is adjusted by multiplying the regenerated components with the noise-blending function. The adjusted noise signal and the adjusted regenerated spectral components are combined.

This particular implementation described above is merely one suitable example. Other noise blending techniques may be used as desired.

Figure 6A:
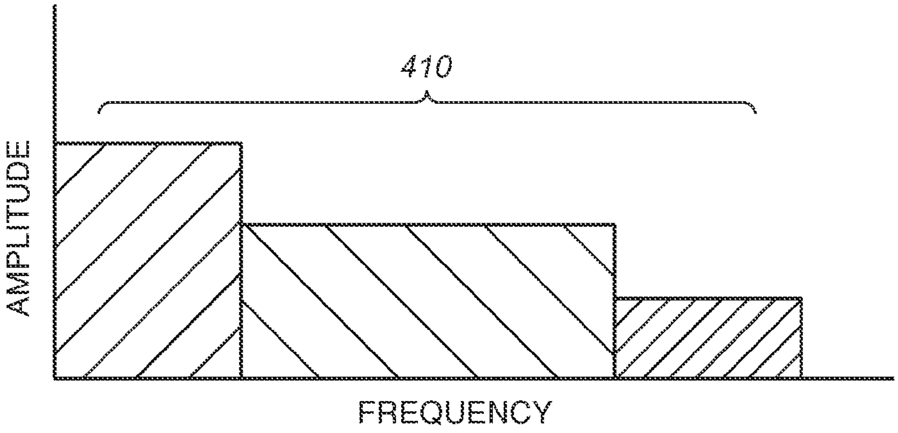
FIGS. 6A-6G are hypothetical graphical illustrations of signals obtained by regenerating high-frequency components using both spectral translation and noise blending.
Figure 6B:
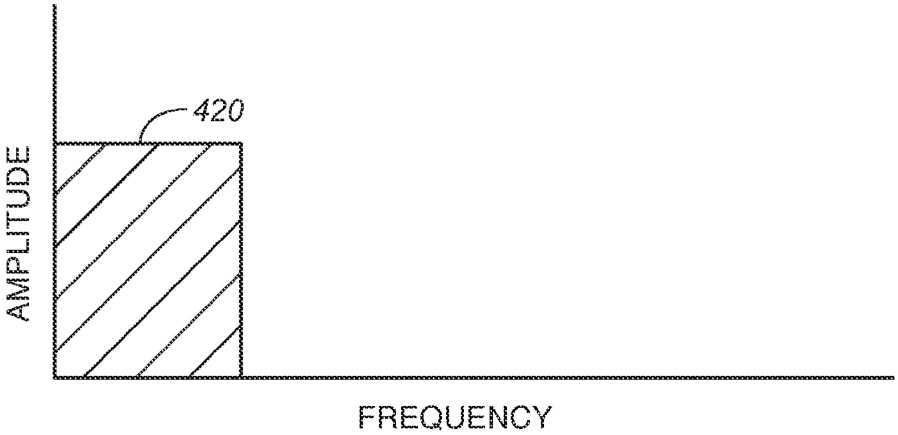
Figure 6C:
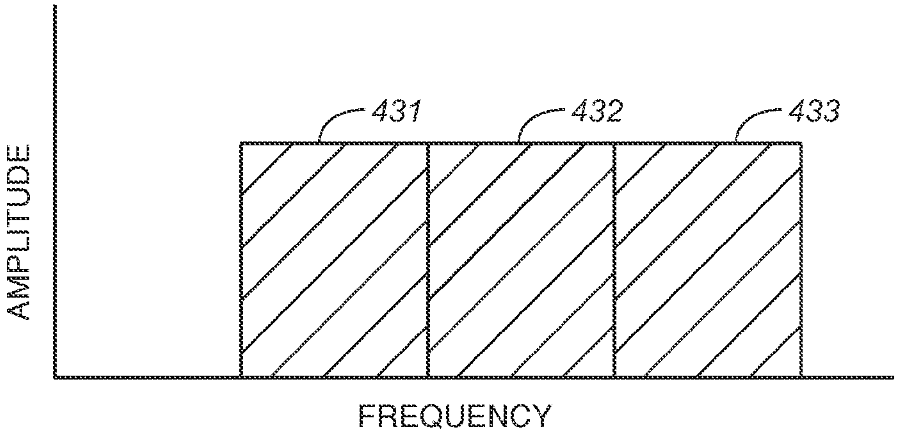
Figure 6D:
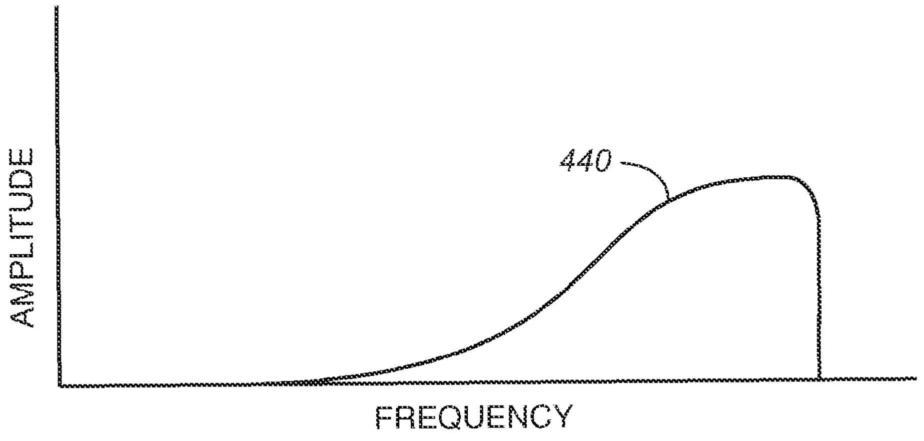
Figure 6E:
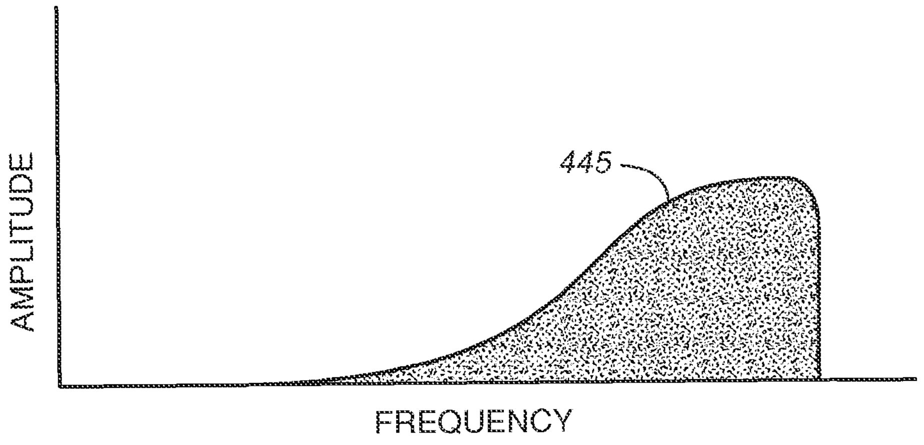
Figure 6F:
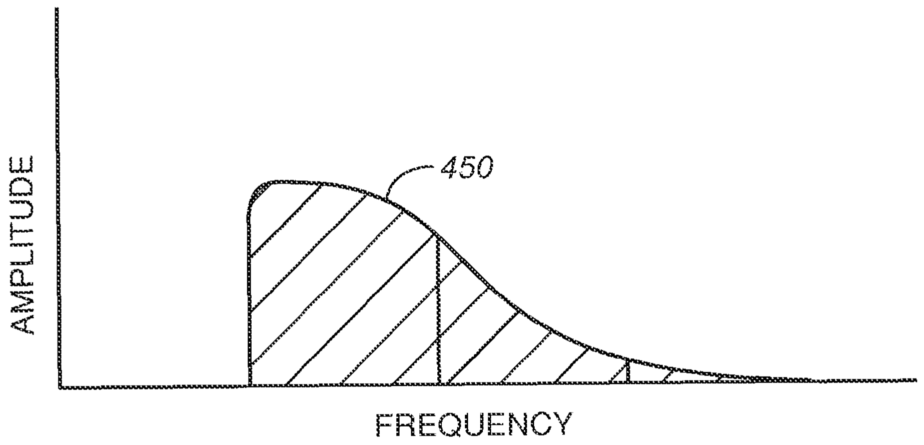
Figure 6G:
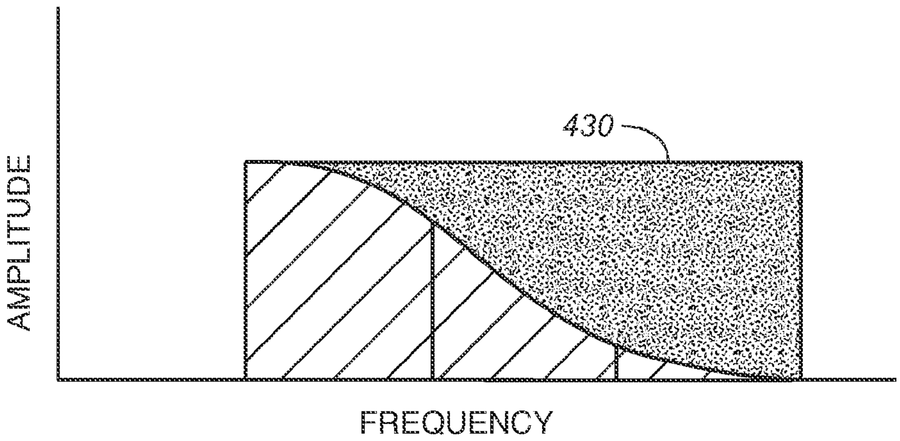

FIGS. 6A through 6G are hypothetical graphical illustrations of the spectral envelopes of signals obtained by regenerating high-frequency components using both spectral translation and noise blending. FIG. 6A shows a hypothetical input signal 410 to be transmitted. FIG. 6B shows the baseband signal 420 produced by discarding high-frequency components. FIG. 6C shows the regenerated high-frequency components 431, 432 and 433. FIG. 6D depicts a possible noise-blending function 440 that gives greater weight to noise components at higher frequencies. FIG. 6E is a schematic illustration of a noise signal 445 that has been multiplied by the noise-blending function 440. FIG. 6F shows a signal 450 generated by multiplying the regenerated high-frequency components 431, 432 and 433 by the inverse of the noise-blending function 440. FIG. 6G is a schematic illustration of a combined signal 460 resulting from adding the adjusted noise signal 445 to the adjusted high-frequency components 450. FIG. 6G is drawn to illustrate schematically that the high-frequency portion 430 contains a mixture of the translated high-frequency components 431, 432 and 433 and noise.

5. Gain Adjuster

Figure 6H:
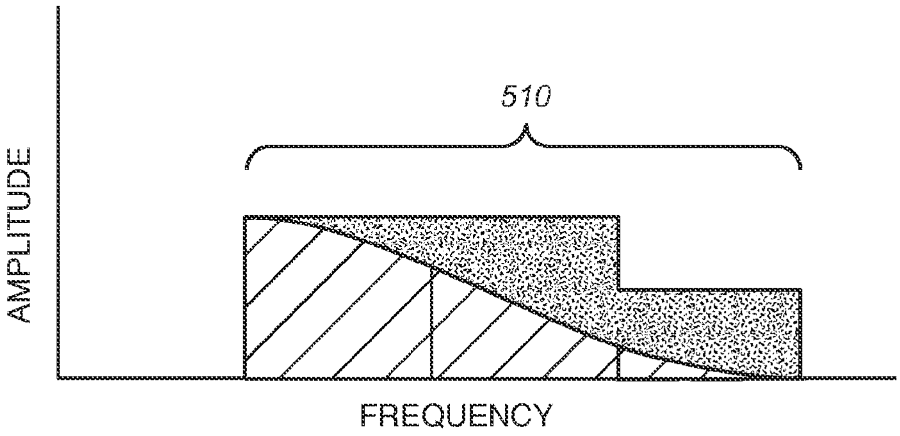
FIG. 6H is an illustration of the signal in FIG. 6G after gain adjustment.

The gain adjuster 820 adjusts the amplitude of the regenerated signal according to the estimated spectral envelope information received from the deformatter 805. FIG. 6H is a hypothetical illustration of the spectral envelope of signal 460 shown in FIG. 6G after gain adjustment. The portion 510 of the signal containing a mixture of translated spectral components and noise has been given a spectral envelope approximating that of the original signal 410 shown in FIG. 6A. Reproducing the spectral envelope on a fine scale is generally unnecessary because the regenerated spectral components do not exactly reproduce the spectral components of the original signal. A translated harmonic series generally will not equal an harmonic series; therefore, it is generally impossible to ensure that the regenerated output signal is identical to the original input signal on a fine scale. Coarse approximations that match the spectral energy within a few critical bands or less have been found to work well. It should also be noted that the use of a coarse estimate of spectral shape rather than a finer approximation is generally preferred because a coarse estimate imposes lower information capacity requirements upon transmission channels and storage media. In audio applications that have more than one channel, however, aural imaging may be improved by using finer approximations of spectral shape so that more precise gain adjustments can be made to ensure a proper balance between channels.

6. Synthesis Filterbank

Figure 7:
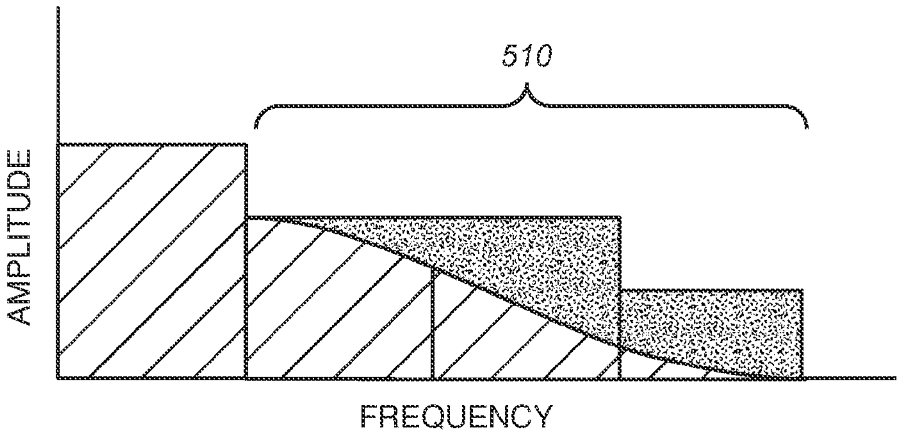
FIG. 7 is an illustration of the baseband signal shown in FIG. 6B combined with the regenerated signal shown in FIG. 6H.

The gain-adjusted regenerated spectral components provided by the gain adjuster 820 are combined with the frequency-domain representation of the baseband signal received from the deformatter 805 to form a frequency-domain representation of a reconstructed signal. This may be done by adding the regenerated components to corresponding components of the baseband signal. FIG. 7 shows a hypothetical reconstructed signal obtained by combining the baseband signal shown in FIG. 6B with the regenerated components shown in FIG. 6H.

The synthesis filterbank 825 transforms the frequency-domain representation into a time domain representation of the reconstructed signal. This filterbank can be implemented in essentially any manner but it should be inverse to the filterbank 705 used in the transmitter 136. In the preferred implementation discussed above, receiver 142 uses O-TDAC synthesis that applies an inverse modified DCT.

D. Alternative Implementations of the Invention

The width and location of the baseband signal can be established in essentially any manner and can be varied dynamically according to input signal characteristics, for example. In one alternative implementation, the transmitter 136 generates a baseband signal by discarding multiple bands of spectral components, thereby creating gaps in the spectrum of the baseband signal. During spectral component regeneration, portions of the baseband signal are translated to regenerate the missing spectral components.

The direction of translation can also be varied. In another implementation, the transmitter 136 discards spectral components at low frequencies to produce a baseband signal located at relatively higher frequencies. The receiver 142 translates portions of the high-frequency baseband signal down to lower-frequency locations to regenerate the missing spectral components.

E. Temporal Envelope Control

Figure 8A:
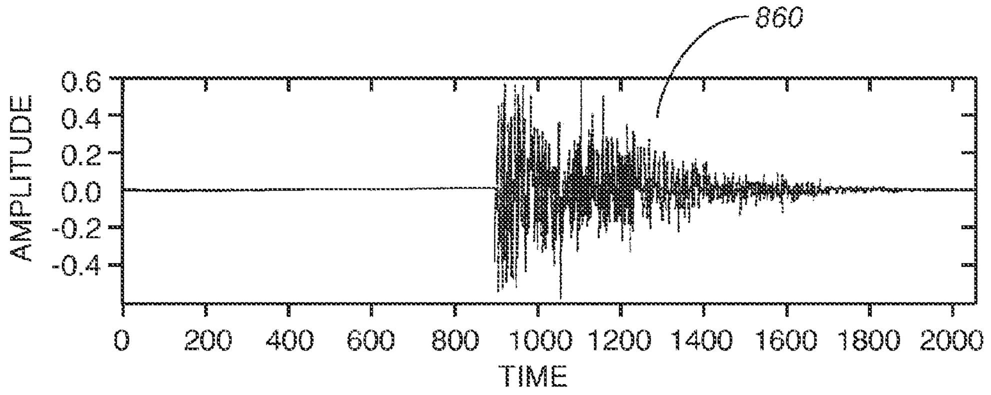
FIG. 8A is an illustration of a signal's temporal shape.
Figure 8B:
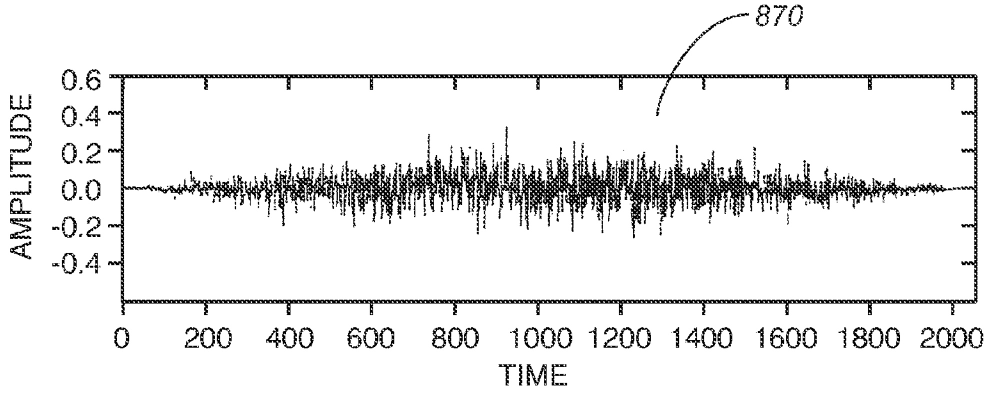
FIG. 8B shows the temporal shape of an output signal that is produced by deriving a baseband signal from the signal in FIG. 8A and regenerating the signal through a process of spectral translation.
Figure 8C:
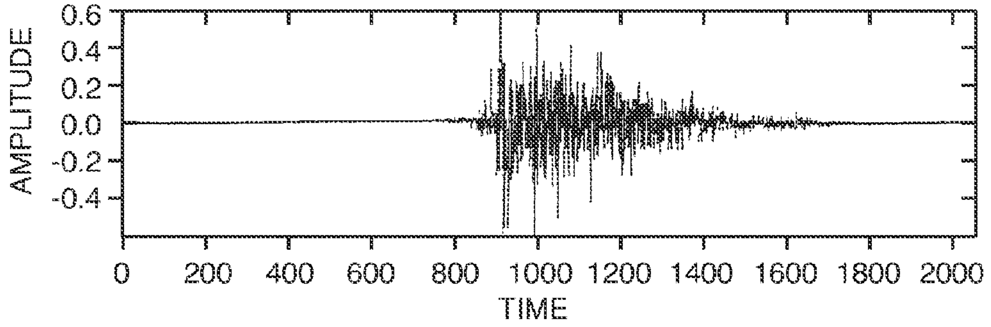
FIG. 8C shows the temporal shape of the signal in FIG. 8B after temporal envelope control has been performed.

The regeneration techniques discussed above are able to generate a reconstructed signal that substantially preserves the spectral envelope of the input audio signal; however, the temporal envelope of the input signal generally is not preserved. FIG. 8A shows the temporal shape of an audio signal 860. FIG. 8B shows the temporal shape of a reconstructed output signal 870 produced by deriving a baseband signal from the signal 860 in FIG. 8A and regenerating discarded spectral components through a process of spectral component translation. The temporal shape of the reconstructed signal 870 differs significantly from the temporal shape of the original signal 860. Changes in the temporal shape can have a significant effect on the perceived quality of a regenerated audio signal. Two methods for preserving the temporal envelope are discussed below.

1. Time-Domain Technique

In the first method, the transmitter 136 determines the temporal envelope of the input audio signal in the time domain and the receiver 142 restores the same or substantially the same temporal envelope to the reconstructed signal in the time domain.

a) Transmitter

Figure 9:
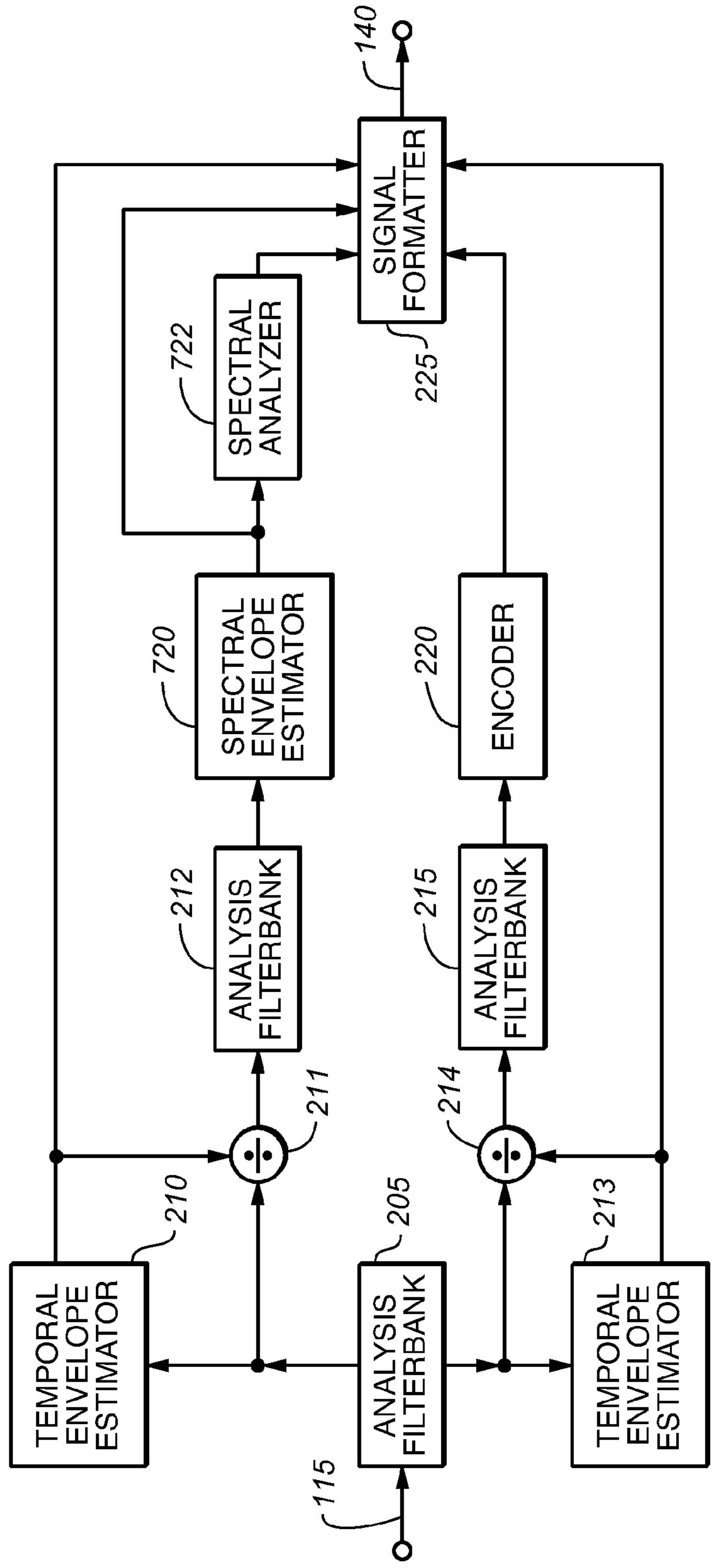
FIG. 9 is a block diagram of a transmitter that provides information needed for temporal envelope control using time-domain techniques.

FIG. 9 shows a block diagram of one implementation of the transmitter 136 in a communication system that provides temporal envelope control using a time-domain technique. The analysis filterbank 205 receives an input signal from path 115 and divides the signal into multiple frequency subband signals. The figure illustrates only two subbands for illustrative clarity; however, the analysis filterbank 205 may divide the input signal into any integer number of subbands that is greater than one.

The analysis filterbank 205 may be implemented in essentially any manner such as one or more Quadrature Mirror Filters (QMF) connected in cascade or, preferably, by a pseudo-QMF technique that can divide an input signal into any integer number of subbands in one filter stage. Additional information about the pseudo-QMF technique may be obtained from Vaidyanathan, "Multirate Systems and Filter Banks," Prentice Hall, New Jersey, 1993, pp. 354-373.

One or more of the subband signals are used to form the baseband signal. The remaining subband signals contain the spectral components of the input signal that are discarded. In many applications, the baseband signal is formed from one subband signal representing the lowest-frequency spectral components of the input signal, but this is not necessary in principle. In one preferred implementation of a system for transmitting or recording an input digital signal sampled at a rate of 44.1 kilosamples/second, the analysis filterbank 205 divides the input signal into four subbands having ranges of frequencies as shown above in Table I. The lowest-frequency subband is used to form the baseband signal.

Referring to the implementation shown in FIG. 9, the analysis filterbank 205 passes the lower-frequency subband signal as the baseband signal to the temporal envelope estimator 213 and the modulator 214. The temporal envelope estimator 213 provides an estimated temporal envelope of the baseband signal to the modulator 214 and to the signal formatter 225. Preferably, baseband signal spectral components that are below about 500 Hz are either excluded from the process that estimates the temporal envelope or are attenuated so that they do not have any significant effect on the shape of the estimated temporal envelope. This may be accomplished by applying an appropriate high-pass filter to the signal that is analyzed by the temporal envelope estimator 213. The modulator 214 divides the amplitude of the baseband signal by the estimated temporal envelope and passes to the analysis filterbank 215 a representation of the baseband signal that is flattened temporally. The analysis filterbank 215 generates a frequency-domain representation of the flattened baseband signal, which is passed to the encoder 220 for encoding. The analysis filterbank 215, as well as the analysis filterbank 212 discussed below, may be implemented by essentially any time-domain-to-frequency-domain transform; however, a transform like the O-TDAC transform that implements a critically-sampled filterbank is generally preferred. The encoder 220 is optional; however, its use is preferred because encoding can generally be used to reduce the information requirements of the flattened baseband signal. The flattened baseband signal, whether in encoded form or not, is passed to the signal formatter 225.

The analysis filterbank 205 passes the higher-frequency subband signal to the temporal envelope estimator 210 and the modulator 211. The temporal envelope estimator 210 provides an estimated temporal envelope of the higher-frequency subband signal to the modulator 211 and to the output signal formatter 225. The modulator 211 divides the amplitude of the higher-frequency subband signal by the estimated temporal envelope and passes to the analysis filterbank 212 a representation of the higher-frequency subband signal that is flattened temporally. The analysis filterbank 212 generates a frequency-domain representation of the flattened higher-frequency subband signal. The spectral envelope estimator 720 and the spectral analyzer 722 provide an estimated spectral envelope and one or more noise-blending parameters, respectively, for the higher-frequency subband signal in essentially the same manner as that described above, and pass this information to the signal formatter 225.

The signal formatter 225 provides an output signal along communication channel 140 by assembling a representation of the flattened baseband signal, the estimated temporal envelopes of the baseband signal and the higher-frequency subband signal, the estimated spectral envelope, and the one or more noise-blending parameters into the output signal. The individual signals and information are assembled into a signal having a form that is suitable for transmission or storage using essentially any desired formatting technique as described above for the signal formatter 725.

b) Temporal Envelope Estimator

The temporal envelope estimators 210 and 213 may be implemented in wide variety of ways. In one implementation, each of these estimators processes a subband signal that is divided into blocks of subband signal samples. These blocks of subband signal samples are also processed by either the analysis filterbank 212 or 215. In many practical implementations, the blocks are arranged to contain a number of samples that is a power of two and is greater than 256 samples. Such a block size is generally preferred to improve the efficiency and the frequency resolution of the transforms used to implement the analysis filterbanks 212 and 215. The length of the blocks may also be adapted in response to input signal characteristics such as the occurrence or absence of large transients. Each block is further divided into groups of 256 samples for temporal envelope estimation. The size of the groups is chosen to balance a tradeoff between the accuracy of the estimate and the amount of information required to convey the estimate in the output signal.

In one implementation, the temporal envelope estimator calculates the power of the samples in each group of subband signal samples. The set of power values for the block of subband signal samples is the estimated temporal envelope for that block. In another implementation, the temporal envelope estimator calculates the mean value of the subband signal sample magnitudes in each group. The set of means for the block is the estimated temporal envelope for that block.

The set of values in the estimated envelope may be encoded in a variety of ways. In one example, the envelope for each block is represented by an initial value for the first group of samples in the block and a set of differential values that express the relative values for subsequent groups. In another example, either differential or absolute codes are used in an adaptive manner to reduce the amount of information required to convey the values.

c) Receiver

Figure 10:
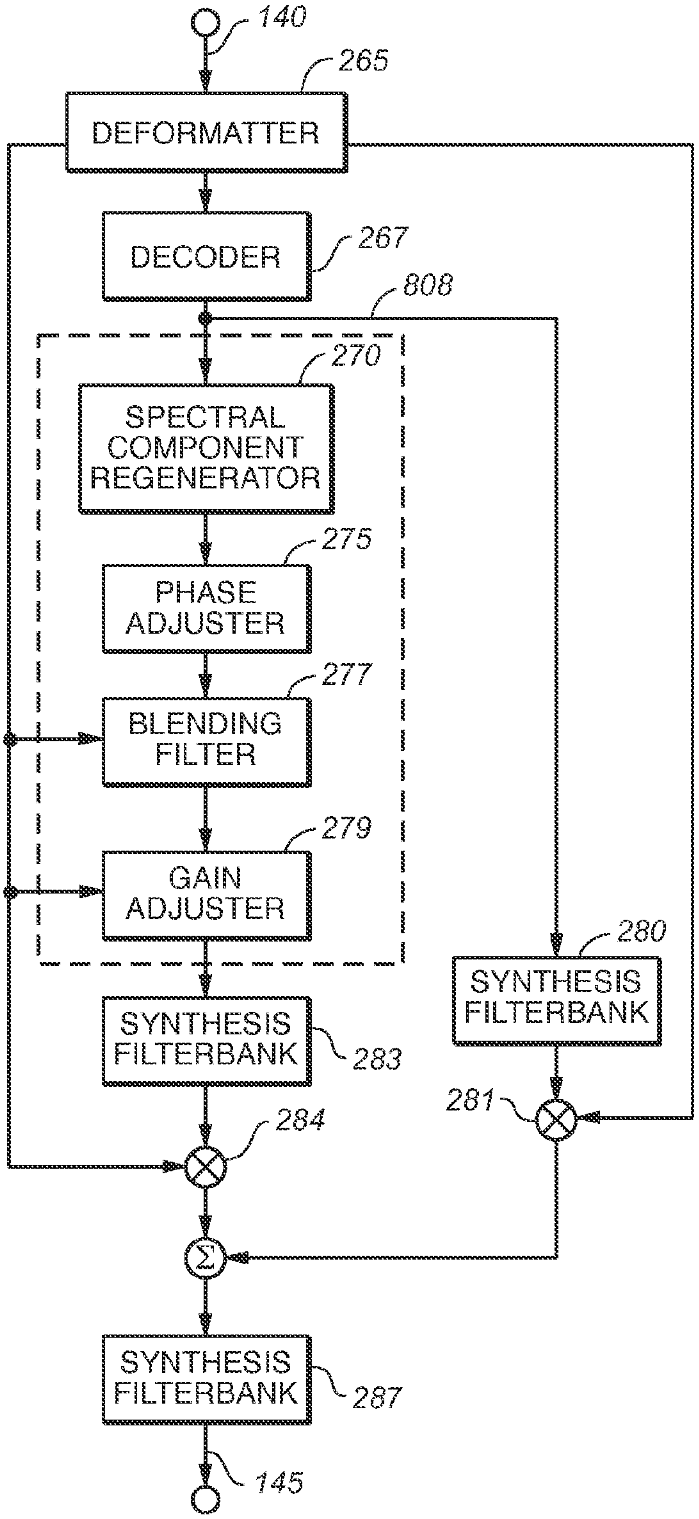
FIG. 10 is a block diagram of a receiver that provides temporal envelope control using time-domain techniques.

FIG. 10 shows a block diagram of one implementation of the receiver 142 in a communication system that provides temporal envelope control using a time-domain technique. The deformatter 265 receives a signal from communication channel 140 and obtains from this signal a representation of a flattened baseband signal, estimated temporal envelopes of the baseband signal and a higher-frequency subband signal, an estimated spectral envelope and one or more noise-blending parameters. The decoder 267 is optional but should be used to reverse the effects of any encoding performed in the transmitter 136 to obtain a frequency-domain representation of the flattened baseband signal.

The synthesis filterbank 280 receives the frequency-domain representation of the flattened baseband signal and generates a time-domain representation using a technique that is inverse to that used by the analysis filterbank 215 in the transmitter 136. The modulator 281 receives the estimated temporal envelope of the baseband signal from the deformatter 265, and uses this estimated envelope to modulate the flattened baseband signal received from the synthesis filterbank 280. This modulation provides a temporal shape that is substantially the same as the temporal shape of the original baseband signal before it was flattened by the modulator 214 in the transmitter 136.

The signal processor 808 receives the frequency-domain representation of the flattened baseband signal, the estimated spectral envelope and the one or more noise-blending parameters from the deformatter 265, and regenerates spectral components in the same manner as that discussed above for the signal processor 808 shown in FIG. 4. The regenerated spectral components are passed to the synthesis filterbank 283, which generates a time-domain representation using a technique that is inverse to that used by the analysis filterbanks 212 and 215 in the transmitter 136. The modulator 284 receives the estimated temporal envelope of the higher-frequency subband signal from the deformatter 265, and uses this estimated envelope to modulate the regenerated spectral components signal received from the synthesis filterbank 283. This modulation provides a temporal shape that is substantially the same as the temporal shape of the original higher-frequency subband signal before it was flattened by the modulator 211 in the transmitter 136.

The modulated subband signal and the modulated higher-frequency subband signal are combined to form a reconstructed signal, which is passed to the synthesis filterbank 287. The synthesis filterbank 287 uses a technique inverse to that used by the analysis filterbank 205 in the transmitter 136 to provide along path 145 an output signal that is perceptually indistinguishable or nearly indistinguishable from the original input signal received from path 115 by the transmitter 136.

2. Frequency-Domain Technique

In the second method, the transmitter 136 determines the temporal envelope of the input audio signal in the frequency domain and the receiver 142 restores the same or substantially the same temporal envelope to the reconstructed signal in the frequency domain.

a) Transmitter

Figure 11:
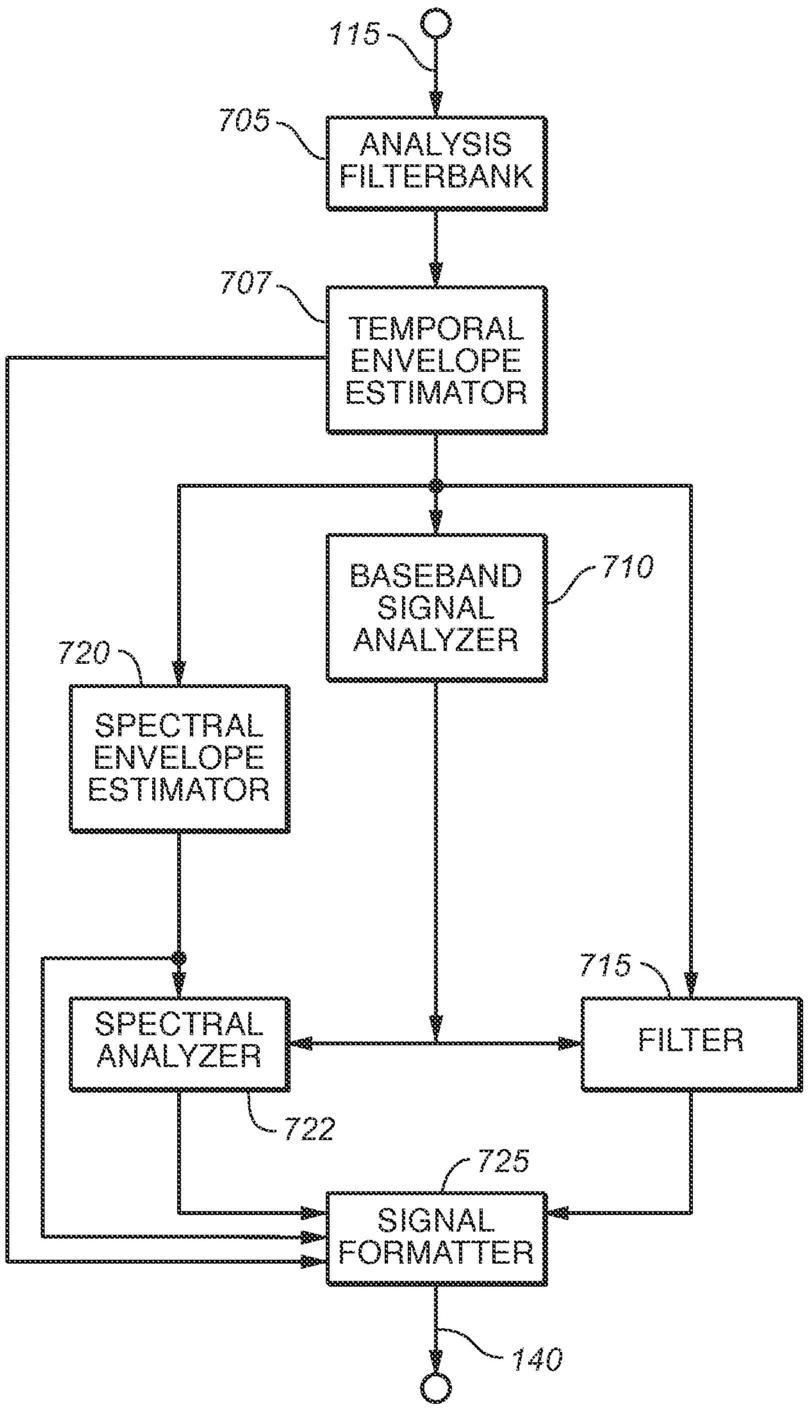
FIG. 11 is a block diagram of a transmitter that provides information needed for temporal envelope control using frequency-domain techniques.

FIG. 11 shows a block diagram of one implementation of the transmitter 136 in a communication system that provides temporal envelope control using a frequency-domain technique. The implementation of this transmitter is very similar to the implementation of the transmitter shown in FIG. 2. The principal difference is the temporal envelope estimator 707. The other components are not discussed here in detail because their operation is essentially the same as that described above in connection with FIG. 2.

Referring to FIG. 11, the temporal envelope estimator 707 receives from the analysis filterbank 705 a frequency-domain representation of the input signal, which it analyzes to derive an estimate of the temporal envelope of the input signal. Preferably, spectral components that are below about 500 Hz are either excluded from the frequency-domain representation or are attenuated so that they do not have any significant effect on the process that estimates the temporal envelope. The temporal envelope estimator 707 obtains a frequency-domain representation of a temporally-flattened version of the input signal by deconvolving a frequency-domain representation of the estimated temporal envelope and the frequency-domain representation of the input signal. This deconvolution may be done by convolving the frequency-domain representation of the input signal with an inverse of the frequency-domain representation of the estimated temporal envelope. The frequency-domain representation of a temporally-flattened version of the input signal is passed to the filter 715, the baseband signal analyzer 710, and the spectral envelope estimator 720. A description of the frequency-domain representation of the estimated temporal envelope is passed to the signal formatter 725 for assembly into the output signal that is passed along the communication channel 140.

b) Temporal Envelope Estimator

The temporal envelope estimator 707 may be implemented in a number of ways. The technical basis for one implementation of the temporal envelope estimator may be explained in terms of the linear system shown in equation 2:

$$y(t)=h(t)\cdot x(t) \tag{2}$$

where y(t)=a signal to be transmitted;

h(t)=the temporal envelope of the signal to be transmitted;

the dot symbol (•) denotes multiplication; and x(t)=a temporally-flat version of the signal y(t).

Equation 2 may be rewritten as:

$$Y[k]=H[k]*X[k] \tag{3}$$

where Y[k]=a frequency-domain representation of the input signal y(t);

H[k]=a frequency-domain representation of h(t);

the star symbol (*) denotes convolution; and

X[k]=a frequency-domain representation of x(t).

Referring to FIG. 11, the signal y(t) is the audio signal that the transmitter 136 receives from path 115. The analysis filterbank 705 provides the frequency-domain representation Y[k] of the signal y(t). The temporal envelope estimator 707 obtains an estimate of the frequency-domain representation H[k] of the signal's temporal envelope h(t) by solving a set of equations derived from an autoregressive moving average (ARMA) model of Y[k] and X[k]. Additional information about the use of ARMA models may be obtained from Proakis and Manolakis, "Digital Signal Processing: Principles, Algorithms and Applications," MacMillan Publishing Co., New York, 1988. See especially pp. 818-821.

In a preferred implementation of the transmitter 136, the filterbank 705 applies a transform to blocks of samples representing the signal y(t) to provide the frequency-domain representation Y[k] arranged in blocks of transform coefficients. Each block of transform coefficients expresses a short-time spectrum of the signal of the signal y(t). The frequency-domain representation X[k] is also arranged in blocks. Each block of coefficients in the frequency-domain representation X[k] represents a block of samples for the temporally-flat signal x(t) that is assumed to be wide sense stationary (WSS). It is also assumed the coefficients in each block of the X[k] representation are independently distributed (ID). Given these assumptions, the signals can be expressed by an ARMA model as follows:

$$Y[k]+\sum_{l=1}^{L}a_lY[k-l]=\sum_{q=0}^{Q}b_qX[k-q] \tag{4}$$

Equation 4 can be solved for $a_l$ and $b_q$ by solving for the autocorrelation of Y[k]:

$$E\{Y[k]\cdot Y[k-m]\}= -\sum_{l=1}^{L}a_lE\{Y[k-l]\cdot Y[k-m]\}+\sum_{q=0}^{Q}b_qE\{X[k-q]\cdot Y[k-m]\} \tag{5}$$

where E{ } denotes the expected value function;

L=length of the autoregressive portion of the ARMA model; and

Q=the length of the moving average portion of the ARMA model.

Equation 5 can be rewritten as:

$$R_{YY}[m]=-\sum_{l=1}^{L}a_lR_{YY}[m-l]+\sum_{q=0}^{Q}b_qR_{XY}[m-q] \tag{6}$$

where $R_{YY}[n]$ denotes the autocorrelation of Y[n]; and $R_{XY}[k]$ denotes the crosscorrelation of Y[k] and X[k].

If we further assume the linear system represented by H[k] is only autoregressive, then the second term on the right side of equation 6 is equal to the variance $\sigma^2_x$ of X[k]. Equation 6 can then be rewritten as:

$$R_{YY}[m]=\begin{cases}-\sum_{l=1}^{L}a_lR_{YY}[m-l] & \text{for } m>0\\ -\sum_{l=1}^{L}a_lR_{YY}[m-l]+\sigma_X^2 & \text{for } m=0\\ R_{YY}[m] & \text{for } m<0\end{cases} \tag{7}$$

Equation 7 can be solved by inverting the following set of linear equations:

$$\begin{bmatrix}R_{YY}[0] & R_{YY}[-1] & R_{YY}[2] & \cdots & R_{YY}[-L]\\ R_{YY}[1] & R_{YY}[0] & R_{YY}[-1] & \cdots & R_{YY}[-L+1]\\ R_{YY}[2] & R_{YY}[1] & R_{YY}[0] & \cdots & R_{YY}[-L+2]\\ \vdots & \vdots & \vdots & \ddots & \vdots\\ R_{YY}[L] & R_{YY}[L-1] & R_{YY}[L-2] & \cdots & R_{YY}[0]\end{bmatrix}\begin{bmatrix}1\\ a_1\\ a_2\\ \vdots\\ a_L\end{bmatrix}=\begin{bmatrix}\sigma_X^2\\ 0\\ 0\\ \vdots\\ 0\end{bmatrix} \tag{8}$$

Given this background, it is now possible to describe one implementation of a temporal envelope estimator that uses frequency-domain techniques. In this implementation, the temporal envelope estimator 707 receives a frequency-domain representation Y[k] of an input signal y(t) and calculates the autocorrelation sequence $R_{XX}[m]$ for $-L\leqq m\leqq L$. These values are used to construct the matrix shown in equation 8. The matrix is then inverted to solve for the coefficients $a_i$. Because the matrix in equation 8 is Toeplitz, it can be inverted by the Levinson-Durbin algorithm. For information, see Proakis and Manolakis, pp. 458-462.

The set of equations obtained by inverting the matrix cannot be solved directly because the variance $\sigma^2_X$ of X[k] is not known; however, the set of equations can be solved for some arbitrary variance such as the value one. Once solved for this arbitrary value, the set of equations yields a set of unnormalized coefficients $\{a'_0, \ldots, a'_L\}$. These coefficients are unnormalized because the equations were solved for an arbitrary variance. The coefficients can be normalized by dividing each by the value of the first unnormalized coefficient $a'_0$, which can be expressed as:

$$a_i = \frac{a'_i}{a'_0} \text{ for } 0 < i \leq L. \quad (9)$$

The variance can be obtained from the following equation.

$$\sigma_X^2 = \frac{1}{a'_0} \quad (10)$$

The set of normalized coefficients $\{1, a_1, \ldots, a_L\}$ represents the zeroes of a flattening filter FF that can be convolved with a frequency-domain representation Y[k] of an input signal y(t) to obtain a frequency-domain representation X[k] of a temporally-flattened version x(t) of the input signal. The set of normalized coefficients also represents the poles of a reconstruction filter FR that can be convolved with the frequency-domain representation X[k] of a temporally-flat signal x(t) to obtain a frequency-domain representation of that flat signal having a modified temporal shape substantially equal to the temporal envelope of the input signal y(t).

The temporal envelope estimator 707 convolves the flattening filter FF with the frequency-domain representation Y[k] received from the filterbank 705 and passes the temporally-flattened result to the filter 715, the baseband signal analyzer 710, and the spectral envelope estimator 720. A description of the coefficients in flattening filter FF is passed to the signal formatter 725 for assembly into the output signal passed along path 140.

c) Receiver

Figure 12:
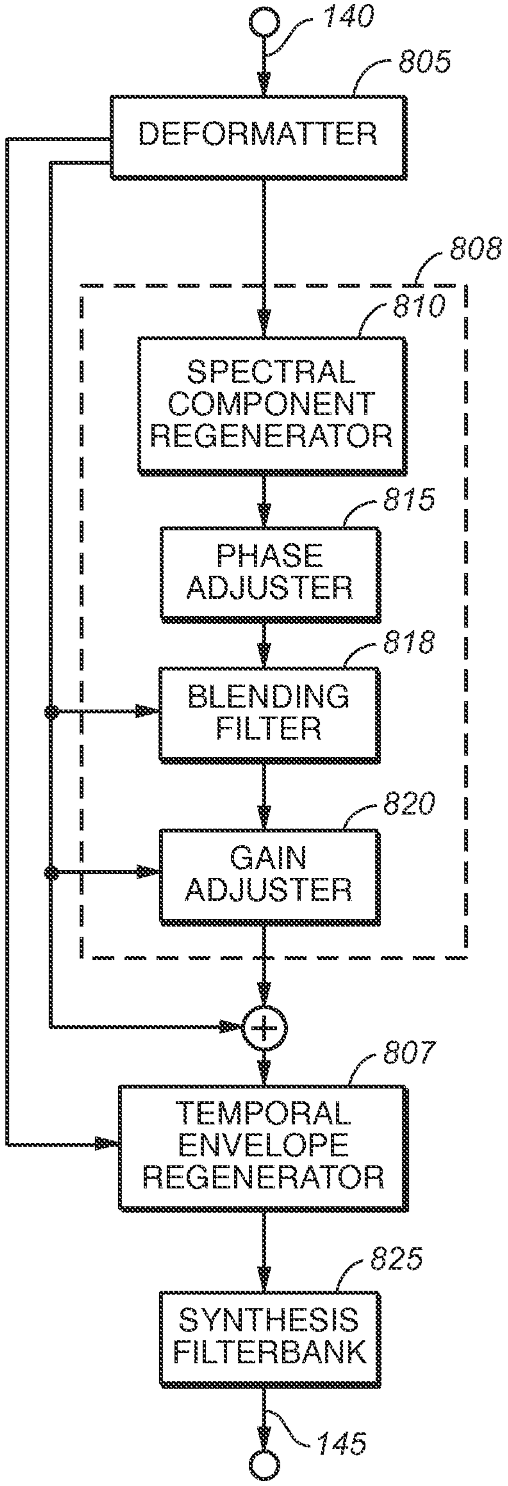
FIG. 12 is a block diagram of a receiver that provides temporal envelope control using frequency-domain techniques.

FIG. 12 shows a block diagram of one implementation of the receiver 142 in a communication system that provides temporal envelope control using a frequency-domain technique. The implementation of this receiver is very similar to the implementation of the receiver shown in FIG. 4. The principal difference is the temporal envelope regenerator 807. The other components are not discussed here in detail because their operation is essentially the same as that described above in connection with FIG. 4.

Referring to FIG. 12, the temporal envelope regenerator 807 receives from the deformatter 805 a description of an estimated temporal envelope, which is convolved with a frequency-domain representation of a reconstructed signal. The result obtained from the convolution is passed to the synthesis filterbank 825, which provides along path 145 an output signal that is perceptually indistinguishable or nearly indistinguishable from the original input signal received from path 115 by the transmitter 136.

The temporal envelope regenerator 807 may be implemented in a number of ways. In an implementation compatible with the implementation of the envelope estimator discussed above, the deformatter 805 provides a set of coefficients that represent the poles of a reconstruction filter FR, which is convolved with the frequency-domain representation of the reconstructed signal.

d) Alternative Implementations

Alternative implementations are possible. In one alternative for the transmitter 136, the spectral components of the frequency-domain representation received from the filterbank 705 are grouped into frequency subbands. The set of subbands shown in Table I is one suitable example. A flattening filter FF is derived for each subband and convolved with the frequency-domain representation of each subband to temporally flatten it. The signal formatter 725 assembles into the output signal an identification of the estimated temporal envelope for each subband. The receiver 142 receives the envelope identification for each subband, obtains an appropriate regeneration filter FR for each subband, and convolves it with a frequency-domain representation of the corresponding subband in the reconstructed signal.

In another alternative, multiple sets of coefficients $\{C_i\}_j$ are stored in a table. Coefficients $\{1, a_1, \ldots, a_L\}$ for flattening filter FF are calculated for an input signal, and the calculated coefficients are compared with each of the multiple sets of coefficients stored in the table. The set $\{C_i\}_j$ in the table that is deemed to be closest to the calculated coefficients is selected and used to flatten the input signal. An identification of the set $\{C_i\}_j$ that is selected from the table is passed to the signal formatter 725 to be assembled into the output signal. The receiver 142 receives the identification of the set $\{C_i\}_j$, consults a table of stored coefficient sets to obtain the appropriate set of coefficients $\{C_i\}_j$, derives a regeneration filter FR that corresponds to the coefficients, and convolves the filter with a frequency-domain representation of the reconstructed signal. This alternative may also be applied to subbands as discussed above.

One way in which a set of coefficients in the table may be selected is to define a target point in an L-dimensional space having Euclidean coordinates equal to the calculated coefficients $(a_1, \ldots, a_L)$ for the input signal or subband of the input signal. Each of the sets stored in the table also defines a respective point in the L-dimensional space. The set stored in the table whose associated point has the shortest Euclidean distance to the target point is deemed to be closest to the calculated coefficients. If the table stores 256 sets of coefficients, for example, an eight-bit number could be passed to the signal formatter 725 to identify the selected set of coefficients.

F. Implementations

The present invention may be implemented in a wide variety of ways. Analog and digital technologies may be used as desired. Various aspects may be implemented by discrete electrical components, integrated circuits, programmable logic arrays, ASICs and other types of electronic components, and by devices that execute programs of instructions, for example. Programs of instructions may be conveyed by essentially any device-readable media such as magnetic and optical storage media, read-only memory and programmable memory.

The invention claimed is:

1. A method for generating an electrical reconstructed signal that comprises:

receiving from an electrical communication path an encoded electrical signal comprising baseband spectral components of an audio signal, a noise blending parameter and an estimated spectral envelope, wherein the number of baseband spectral components contained in the encoded signal may vary dynamically;

decoding the encoded electrical signal to obtain the baseband spectral components, the noise blending parameter, and the estimated spectral envelope;

generating a noise signal comprising noise-signal spectral components in an interval of frequencies above the baseband spectral components, wherein the noise-signal spectral components are weighted in amplitude by a noise blending function that is a function of frequency and the noise blending parameter and that gives greater weight to spectral components at higher frequencies;

generating a regenerated signal comprising regenerated-signal spectral components in the interval of frequencies above the baseband spectral components, wherein the regenerated-signal components are copied from at least some of the baseband spectral components and weighted in amplitude by an inverse of the noise blending function;

generating noisy regenerated spectral components from a combination of the noise-signal spectral components and the regenerated-signal spectral components, wherein amplitudes of the noisy regenerated spectral components are weighted according to the estimated spectral envelope; and generating along an electrical communication path the electrical reconstructed signal from a time-domain representation of the baseband spectral components combined with the noisy regenerated spectral components.

2. The method of claim 1, wherein the time-domain representation of the baseband spectral components is obtained to represent segments of the reconstructed signal that vary in length.

3. The method of claim 1 that comprises applying a time-domain aliasing cancellation synthesis transform to obtain the time-domain representation of the baseband spectral components.

4. The method of claim 1 that comprises adapting the generating of the regenerated signal by changing which baseband spectral components are copied or by changing the frequency amount by which baseband spectral components are copied.

5. The method of claim 1, wherein:

the data also represents one or more additional noise blending parameters; and the noise blending function is also a function of the one or more additional noise blending parameters.

6. The method of claim 1, wherein the regenerated signal comprises regenerated-signal spectral components copied from the baseband spectral components in a circular manner into one or more additional intervals of frequencies.

7. An apparatus for generating a reconstructed signal that comprises:

means for receiving an encoded signal comprising baseband spectral components of an audio signal, a noise blending parameter and an estimated spectral envelope, wherein the number of baseband spectral components contained in the encoded signal may vary dynamically;

means for decoding the encoded signal to obtain the baseband spectral components, the noise blending parameter, and the estimated spectral envelope;

means for generating a noise signal comprising noise-signal spectral components in an interval of frequencies above the baseband spectral components, wherein the noise-signal spectral components are weighted in amplitude by a noise blending function that is a function of frequency and the noise blending parameter and that gives greater weight to spectral components at higher frequencies;

means for generating a regenerated signal comprising regenerated-signal spectral components in the interval of frequencies above the baseband spectral components, wherein the regenerated-signal components are copied from at least some of the baseband spectral components and weighted in amplitude by an inverse of the noise blending function;

means for generating noisy regenerated spectral components from a combination of the noise-signal spectral components and the regenerated-signal spectral components, wherein amplitudes of the noisy regenerated spectral components are weighted according to the estimated spectral envelope; and means for generating the reconstructed signal from a time-domain representation of the baseband spectral components combined with the noisy regenerated spectral components.

8. The apparatus of claim 7, wherein the time-domain representation of the baseband spectral components is obtained to represent segments of the reconstructed signal that vary in length. time-domain aliasing cancellation synthesis transform to obtain the time-domain representation of the baseband spectral components.

9. The apparatus of claim 7 that comprises means for applying a time-domain aliasing cancellation synthesis transform to obtain the time-domain representation of the baseband spectral components.

10. The apparatus of claim 7 that comprises means for adapting the generating of the regenerated signal by changing which baseband spectral components are copied or by changing the frequency amount by which baseband spectral components are copied.

11. The apparatus of claim 7, wherein:

the data also represents one or more additional noise blending parameters; and the noise blending function is also a function of the one or more additional noise blending parameters.

12. The apparatus of claim 7, wherein the regenerated signal comprises regenerated-signal spectral components copied from the baseband spectral components in a circular manner into one or more additional intervals of frequencies.

13. A non-transitory medium recording a program of instructions that is executable by a device to perform a method for generating a reconstructed signal, wherein the method comprises:

receiving an encoded signal comprising baseband spectral components of an audio signal, a noise blending parameter and an estimated spectral envelope, wherein the number of baseband spectral components contained in the encoded signal may vary dynamically;

decoding the encoded signal to obtain the baseband spectral components, the noise blending parameter, and the estimated spectral envelope;

generating a noise signal comprising noise-signal spectral components in an interval of frequencies above the baseband spectral components, wherein the noise-signal spectral components are weighted in amplitude by a noise blending function that is a function of frequency and the noise blending parameter and that gives greater weight to spectral components at higher frequencies;

generating a regenerated signal comprising regenerated-signal spectral components in the interval of frequencies above the baseband spectral components, wherein the regenerated-signal components are copied from at least some of the baseband spectral components and weighted in amplitude by an inverse of the noise blending function;

generating noisy regenerated spectral components from a combination of the noise-signal spectral components and the regenerated-signal spectral components, wherein amplitudes of the noisy regenerated spectral components are weighted according to the estimated spectral envelope; and generating the reconstructed signal from a time-domain representation of the baseband spectral components combined with the noisy regenerated spectral components.

14. The medium of claim 13, wherein the time-domain representation of the baseband spectral components is obtained to represent segments of the reconstructed signal that vary in length.

15. The medium of claim 13, wherein the method comprises applying a time-domain aliasing cancellation synthesis transform to obtain the time-domain representation of the baseband spectral components.

16. The medium of claim 13, wherein the method comprises adapting the generating of the regenerated signal by changing which baseband spectral components are copied or by changing the frequency amount by which baseband spectral components are copied.

17. The medium of claim 13, wherein:

the data also represents one or more additional noise blending parameters; and the noise blending function is also a function of the one or more additional noise blending parameters.

18. The medium of claim 13, wherein the regenerated signal comprises regenerated-signal spectral components copied from the baseband spectral components in a circular manner into one or more additional intervals of frequencies.

* * * * *